(12) United States Patent
Laduca et al.

(10) Patent No.: US 12,551,678 B2
(45) Date of Patent: Feb. 17, 2026

(54) VALVE SYSTEMS AND STEERING SYSTEMS FOR CATHETERS AND METHODS OF USE

(71) Applicant: DUKE EMPIRICAL, INC., Morgan Hill, CA (US)

(72) Inventors: Robert C. Laduca, Santa Cruz, CA (US); Paul A. Laduca, Orchard Park, NY (US)

(73) Assignee: Duke Empirical, LLC, Morgan Hill, CA (US)

( * ) Notice: Subject to any disclaimer, the term of this patent is extended or adjusted under 35 U.S.C. 154(b) by 690 days.

(21) Appl. No.: 17/361,159

(22) Filed: Jun. 28, 2021

(65) Prior Publication Data
US 2021/0402165 A1 Dec. 30, 2021

Related U.S. Application Data

(60) Provisional application No. 63/044,844, filed on Jun. 26, 2020.

(51) Int. Cl.
*A61M 39/06* (2006.01)
*A61M 25/01* (2006.01)
*A61M 39/02* (2006.01)

(52) U.S. Cl.
CPC .... *A61M 39/0613* (2013.01); *A61M 25/0136* (2013.01); *A61M 39/0247* (2013.01); *A61M 2039/0258* (2013.01); *A61M 2039/0279* (2013.01); *A61M 2039/062* (2013.01); *A61M 2039/0686* (2013.01)

(58) Field of Classification Search
CPC .............. A61M 39/0247; A61M 39/06; A61M 39/0606; A61M 39/0613; A61M 39/22; A61M 39/223; A61M 2039/02433; A61M 2039/02473; A61M 2039/0248; A61M 2039/0258; A61M 2039/0279; A61M 2039/062; A61M 2039/0626; A61M 2039/0633; A61M 2039/0673; A61M 2039/0686; A61M 2039/224; A61M 2039/226; A61M 25/0136; A61B 17/3423; A61B 17/3462; A61B 2017/3464; A61B 2017/3466

See application file for complete search history.

(56) References Cited

U.S. PATENT DOCUMENTS

| | | |
|---|---|---|
| 4,960,412 A | 10/1990 | Fink |
| 2001/0049499 A1 | 12/2001 | Lui et al. |
| 2002/0082584 A1* | 6/2002 | Rosenman ........ A61M 25/0068 604/523 |
| 2002/0183723 A1 | 12/2002 | Belef et al. |
| 2010/0036329 A1 | 2/2010 | Razack |
| 2010/0082016 A1 | 4/2010 | Graham |
| 2011/0251565 A1 | 10/2011 | Malewicz |
| 2011/0264074 A1* | 10/2011 | Tegg ..................... A61B 5/062 604/523 |
| 2012/0158021 A1 | 6/2012 | Morrill |
| 2012/0238958 A1* | 9/2012 | Moore .............. A61M 39/0613 604/167.03 |

(Continued)

FOREIGN PATENT DOCUMENTS

WO    WO 2021/263244    12/2021

*Primary Examiner* — Robert A Lynch
(74) *Attorney, Agent, or Firm* — Levine Bagade Han LLP

(57) ABSTRACT

Valve systems and steering systems for catheters and methods of using the same.

13 Claims, 15 Drawing Sheets

(56) References Cited

U.S. PATENT DOCUMENTS

2018/0071488 A1\* 3/2018 Khuu ..................... F16H 19/04
2018/0344981 A1   12/2018 Laduca et al.
2019/0070401 A1    3/2019 Merritt et al.

\* cited by examiner

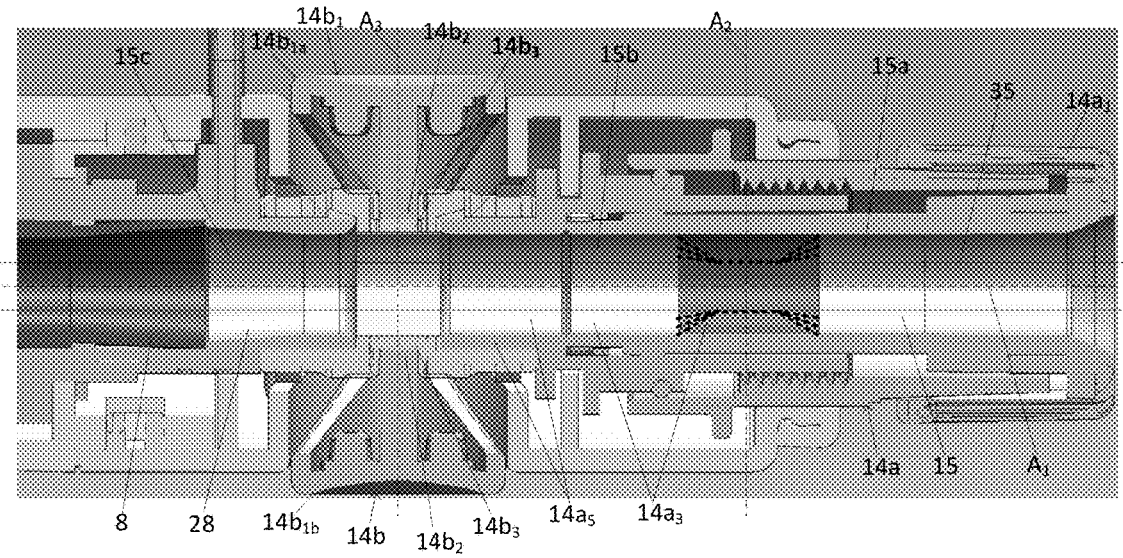
Figure 3F
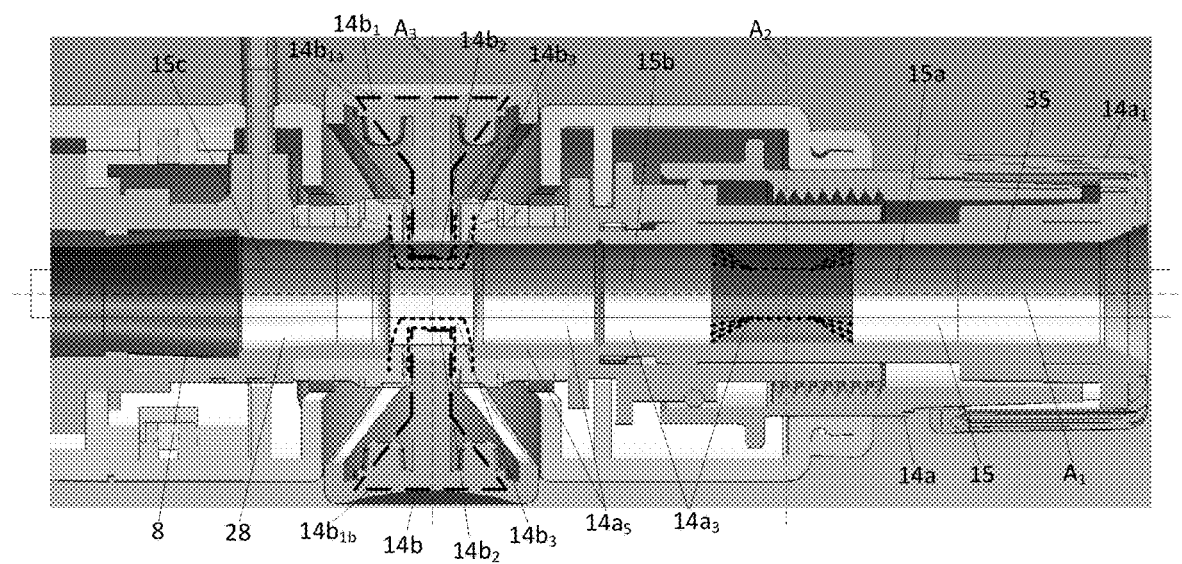
Figure 3G$_1$

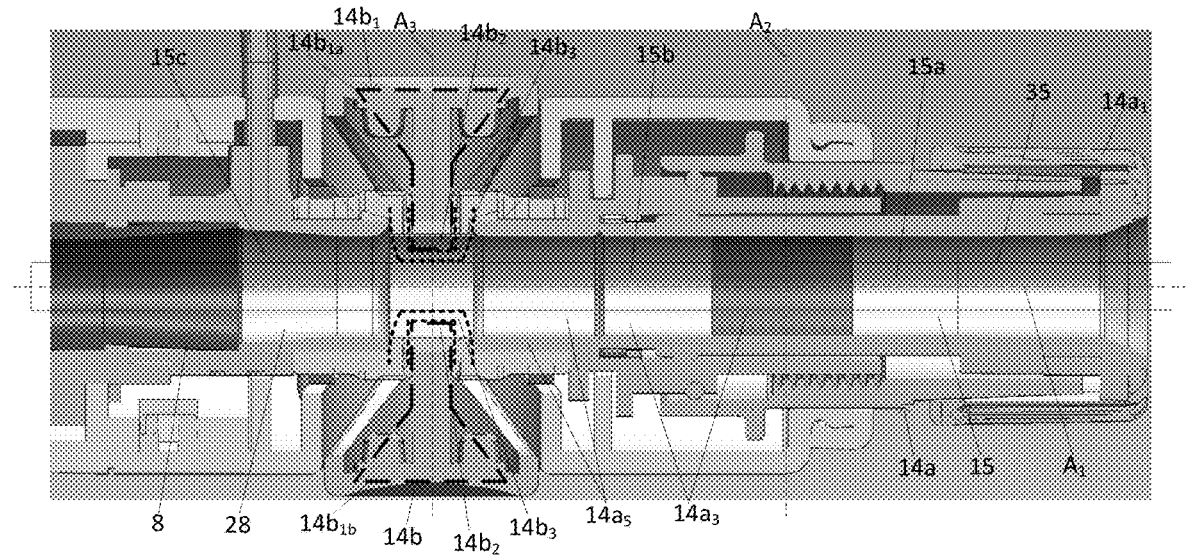
Figure 3G$_2$
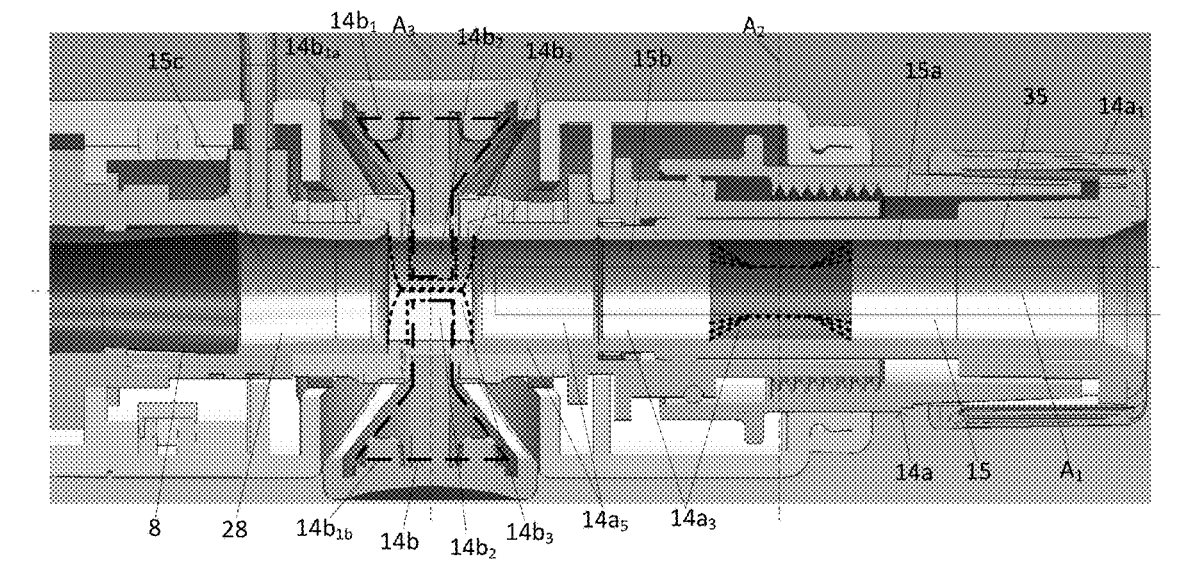
Figure 3H$_1$

Figure 3H₂

VALVE SYSTEMS AND STEERING SYSTEMS FOR CATHETERS AND METHODS OF USE

CROSS-REFERENCE TO RELATED APPLICATIONS

This application claims the benefit of priority to U.S. Patent Application No. 63/044,844 filed Jun. 26, 2020, which is incorporated herein by reference in its entirety for all purposes.

TECHNICAL FIELD

This disclosure relates to valve systems and steering systems for catheters.

BACKGROUND

A need exists for improved valve systems for catheters that can better inhibit or prevent blood loss, that can better inhibit or prevent the introduction of air to the patient that could create air embolism and patient injury, and that can seal against variable sized devices.

A need also exists for customizable and/or modular valve systems to improve the versatility of current catheter systems.

A need also exists for improved steering systems for catheters that can inhibit or prevent the pull wires from becoming distorted during use and that can provide more deflection.

The valve systems and steering systems disclosed herein address these needs.

SUMMARY

Valve systems for catheters are disclosed that can be variably opened and closed against devices having various sizes to inhibit or prevent fluid introduction or loss from the catheters during use. Modular and customizable valve systems are also disclosed.

Steering systems for catheters are disclosed that can inhibit or prevent pull wires from distorting during use.

BRIEF DESCRIPTION OF THE DRAWINGS

The drawings shown and described are exemplary embodiments and non-limiting. Like reference numerals indicate identical or functionally equivalent features throughout.

Figure 1A:
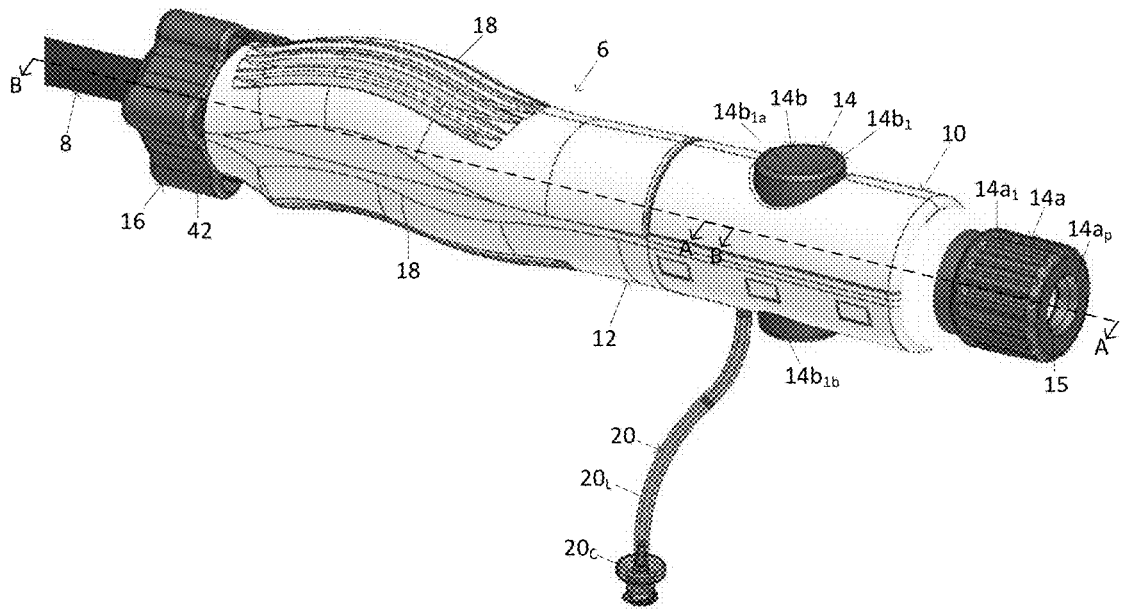
FIG. 1A illustrates a variation of a sheath, a valve system, and a steering system.

FIG. $3G_1$ illustrates a variation of a cross-section view through the line A-A in FIG. 1A showing a valve configuration during use (e.g., during unloading) in which a first valve is closed and a second valve is closed.

FIG. $3G_2$ illustrates a variation of a cross-section view through the line A-A in FIG. 1A showing a valve configuration during use (e.g., during unloading) in which a first valve is open and a second valve is closed.

FIG. $3H_1$ illustrates a variation of a cross-section view through the line A-A in FIG. 1A showing a valve configuration during use (e.g., during unloading) in which a first valve is closed and a second valve is closed.

FIG. $3H_2$ illustrates a variation of a cross-section view through the line A-A in FIG. 1A showing a valve configuration during use (e.g., during unloading) in which a first valve is open and a second valve is closed.

Figure 3A:
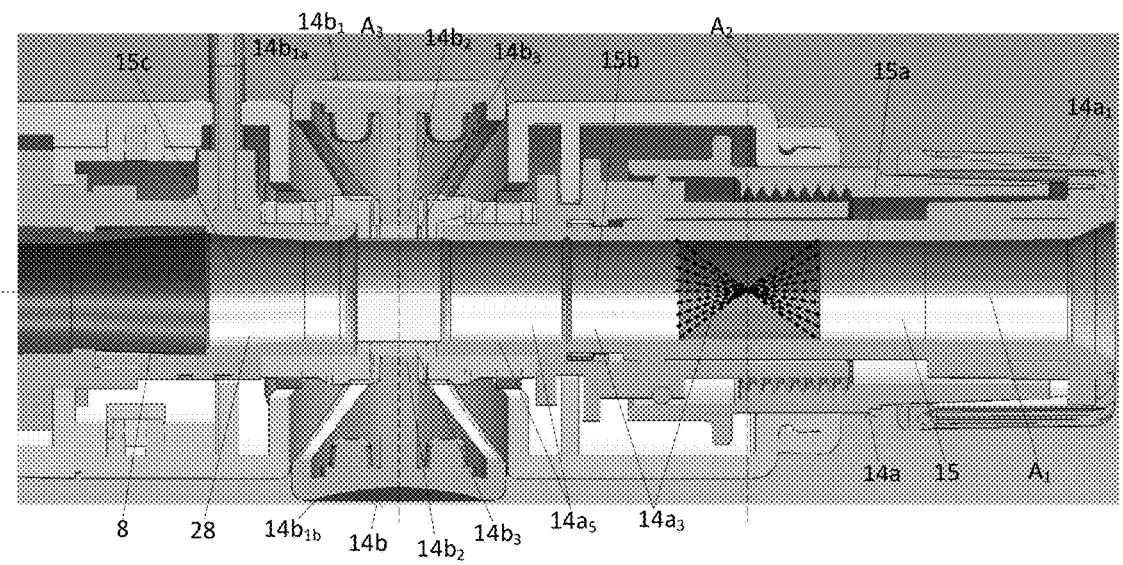
FIG. 3A illustrates a variation of a cross-section view through the line A-A in FIG. 1A showing a valve configuration during use (e.g., during insertion) in which a first valve is closed and a second valve is open.
Figure 3B:
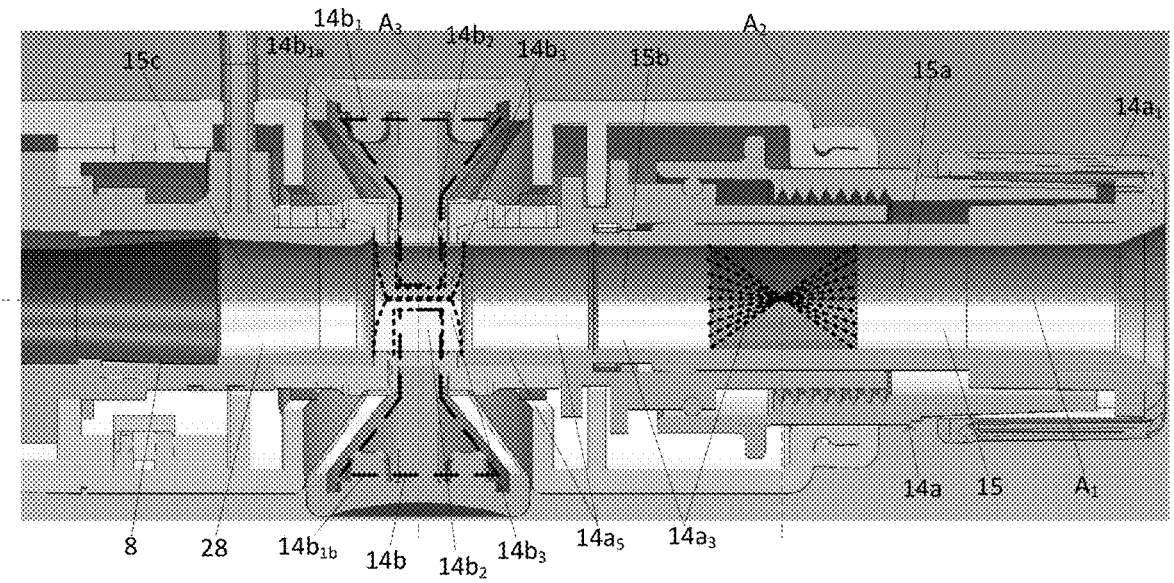
FIG. 3B illustrates a variation of a cross-section view through the line A-A in FIG. 1A showing a valve configuration during use (e.g., during loading) in which a first valve is closed and a second valve is closed.
Figure 3C:
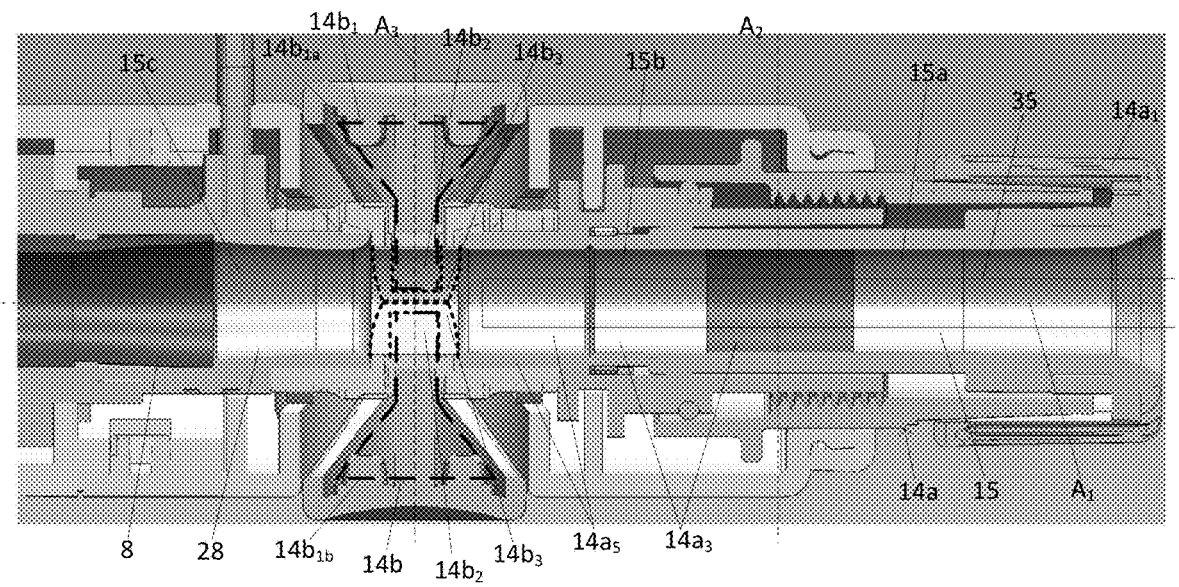
FIG. 3C illustrates a variation of a cross-section view through the line A-A in FIG. 1A showing a valve configuration during use (e.g., during loading) in which a first valve is open and a second valve is closed.
Figure 3D:
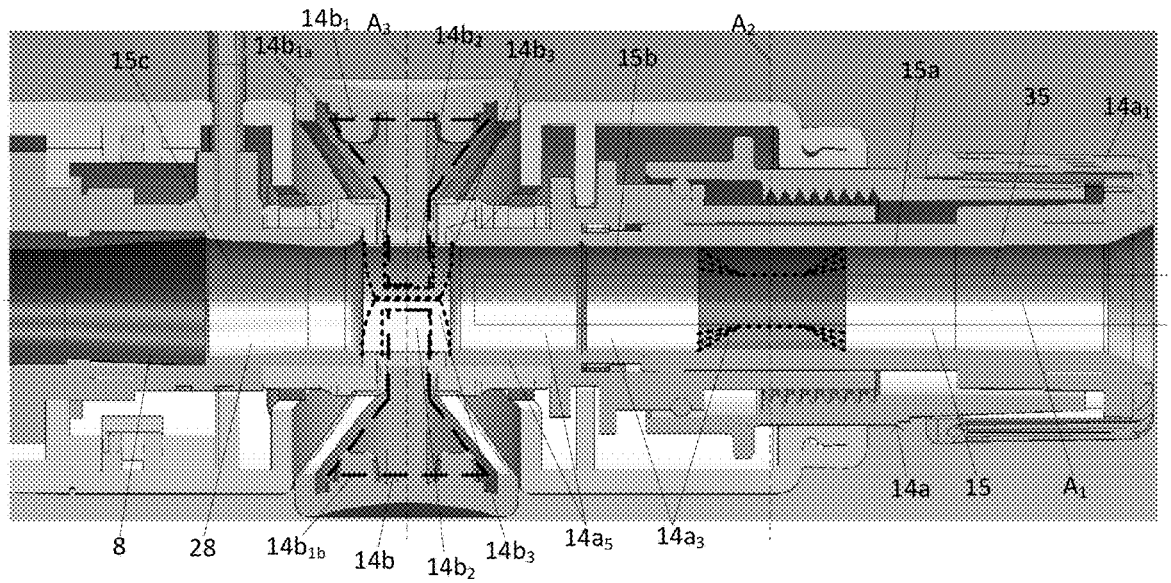
FIG. 3D illustrates a variation of a cross-section view through the line A-A in FIG. 1A showing a valve configuration during use (e.g., during loading) in which a first valve is closed and a second valve is closed.
Figure 3E:
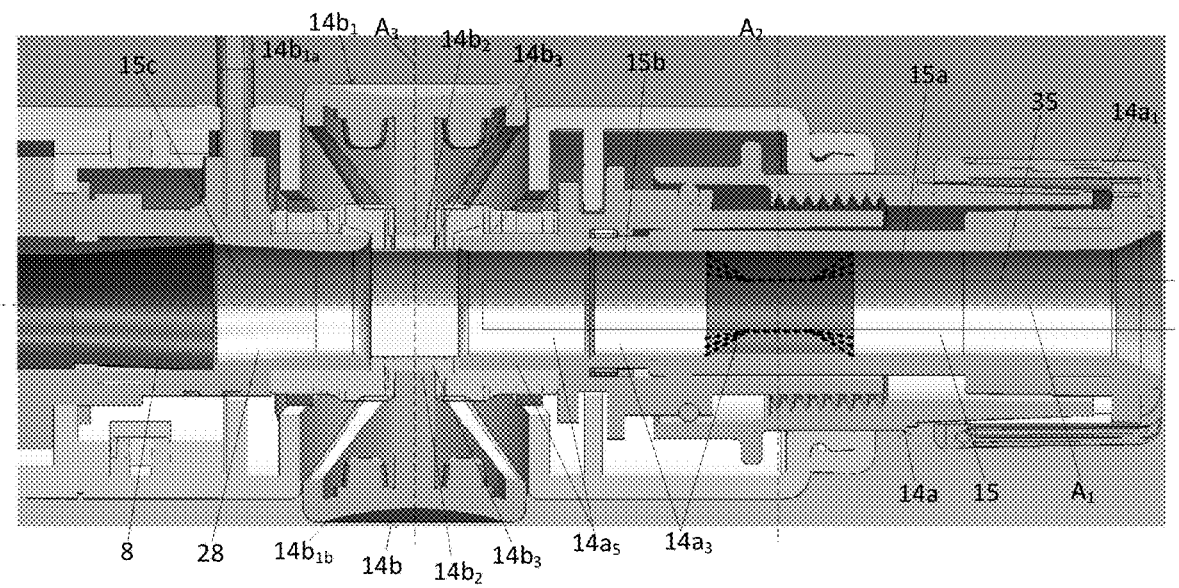
FIG. 3E illustrates a variation of a cross-section view through the line A-A in FIG. 1A showing a valve configuration during use (e.g., during loading) in which a first valve is closed and a second valve is open.
Figure 3I:
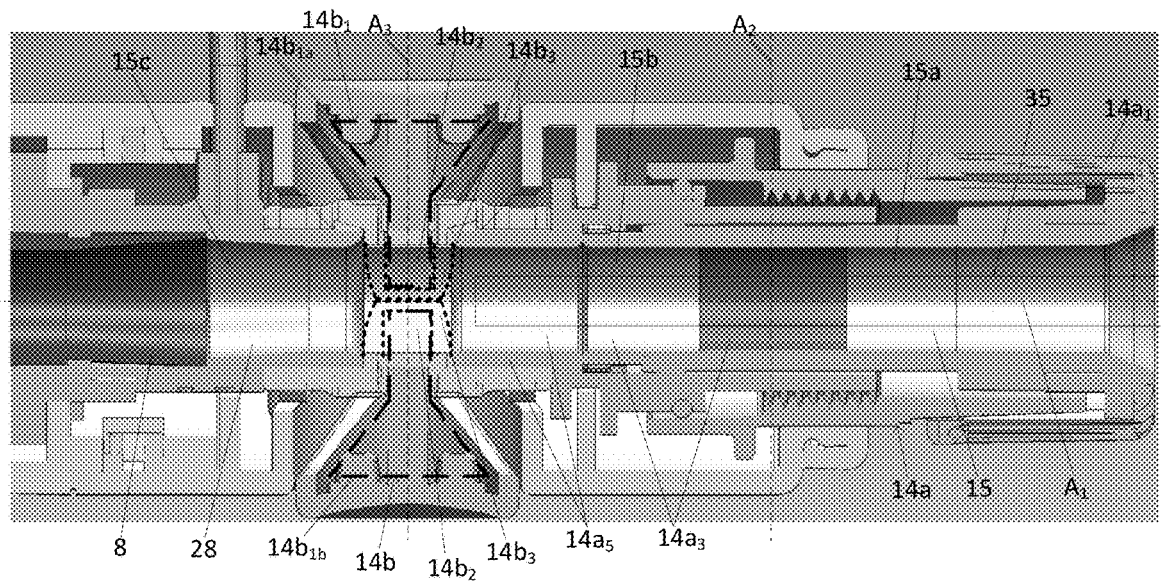
FIG. 3F illustrates a variation of a cross-section view through the line A-A in FIG. 1A showing a valve configuration during use (e.g., during loading) in which a first valve is closed and a second valve is open.
Figure 3I:
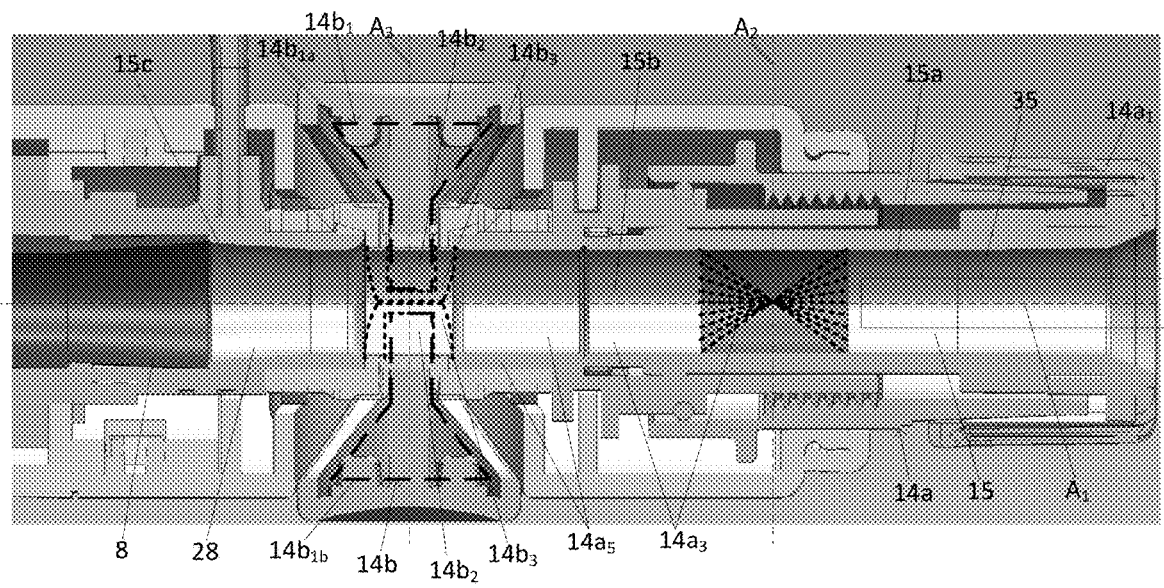

FIG. 3I illustrates a variation of a cross-section view through the line A-A in FIG. 1A showing a valve configuration during use (e.g., during unloading) in which a first valve is closed and a second valve is closed.

Figure 3J:
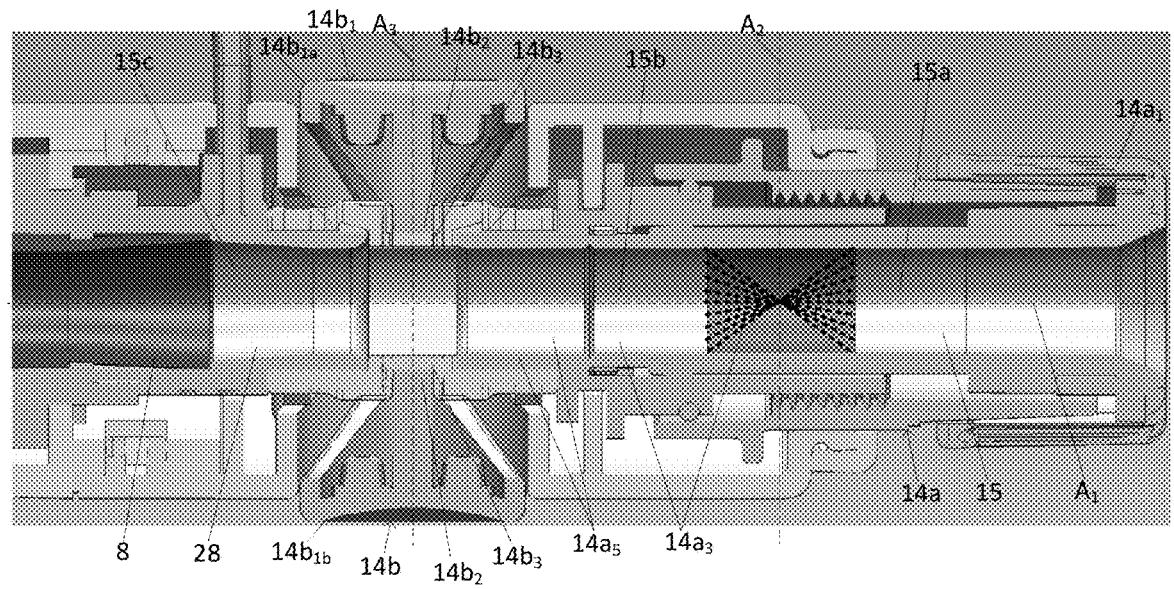

FIG. 3J illustrates a variation of a cross-section view through the line A-A in FIG. 1A showing a valve configuration during use (e.g., during unloading) in which a first valve is closed and a second valve is open.

Figure 4A:
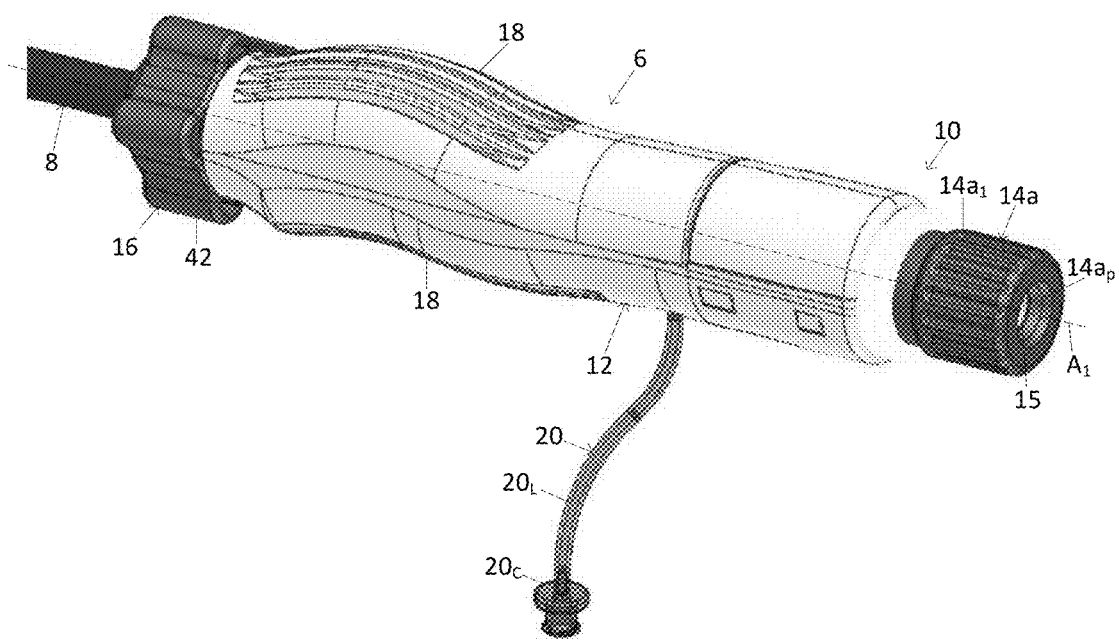

FIG. 4A illustrates another variation of a sheath, a valve system, and a steering system.

Figure 4B:
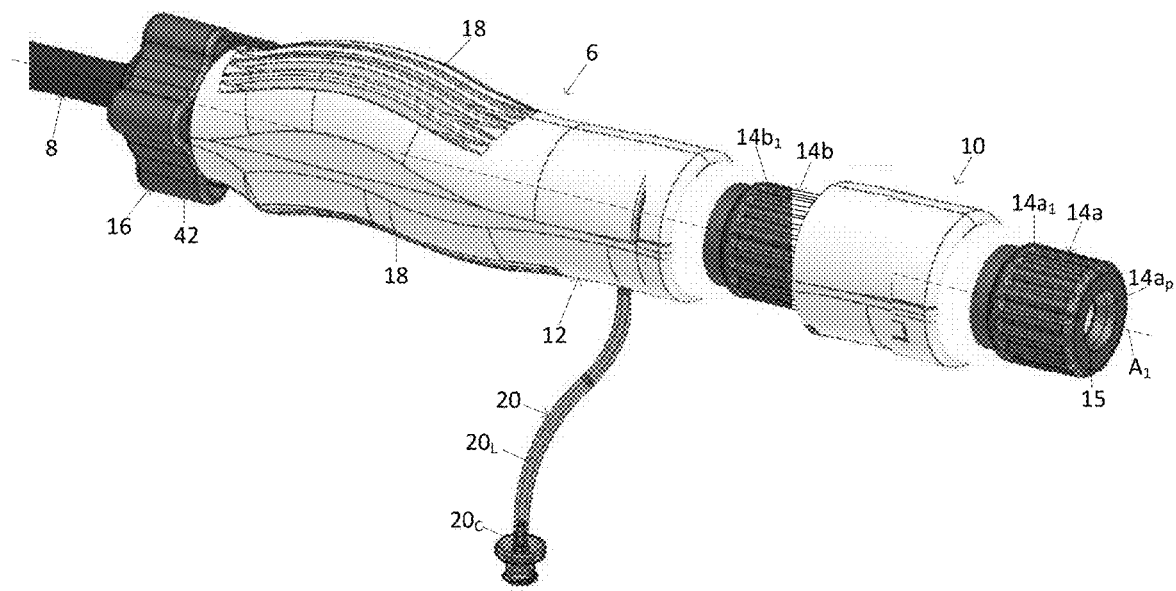

FIG. 4B illustrates another variation of a sheath, a valve system, and a steering system.

Figure 5:
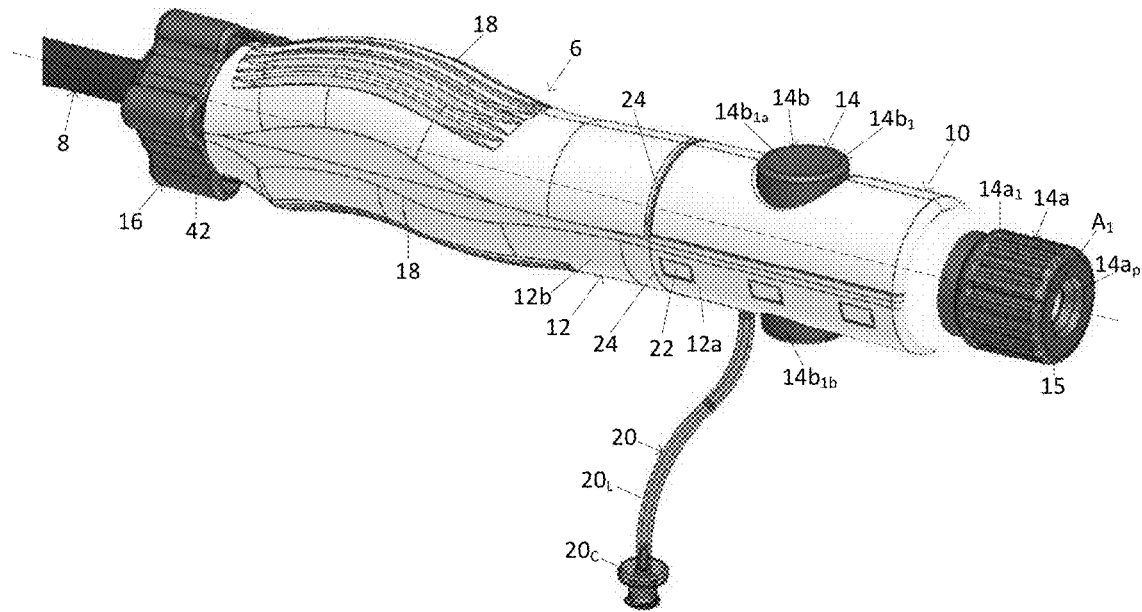

FIG. 5 illustrates a variation of a modular system.

Figure 6A:
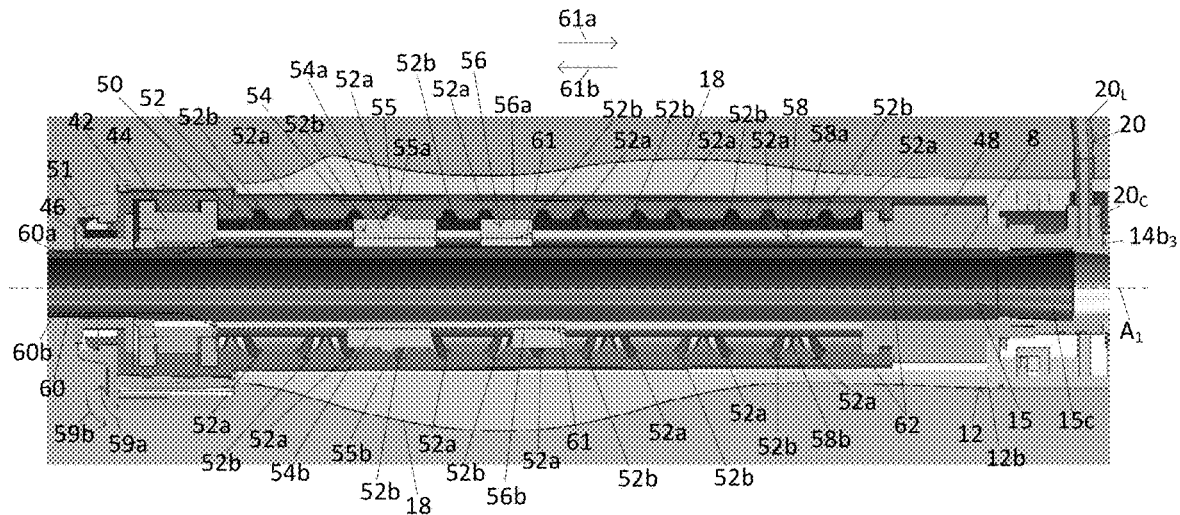

FIG. 6A illustrates a variation of a cross-section view through the line B-B in FIG. 1A and shows a variation a steering system.

Figure 6B:
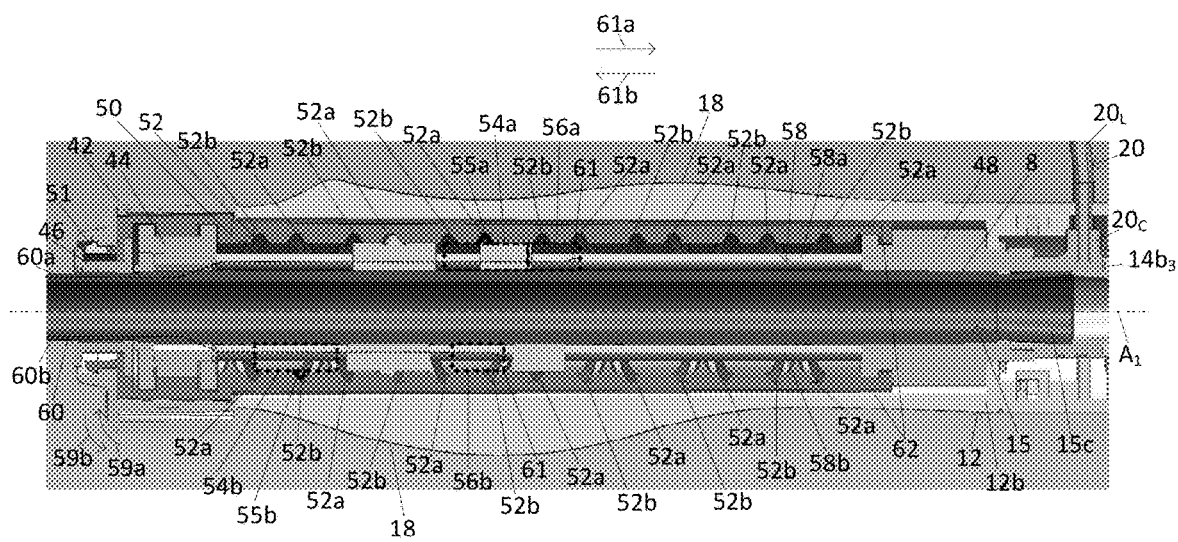

FIG. 6B illustrates a variation of the steering system of FIG. 6A when the catheter is deflected in a first direction.

Figure 6C:
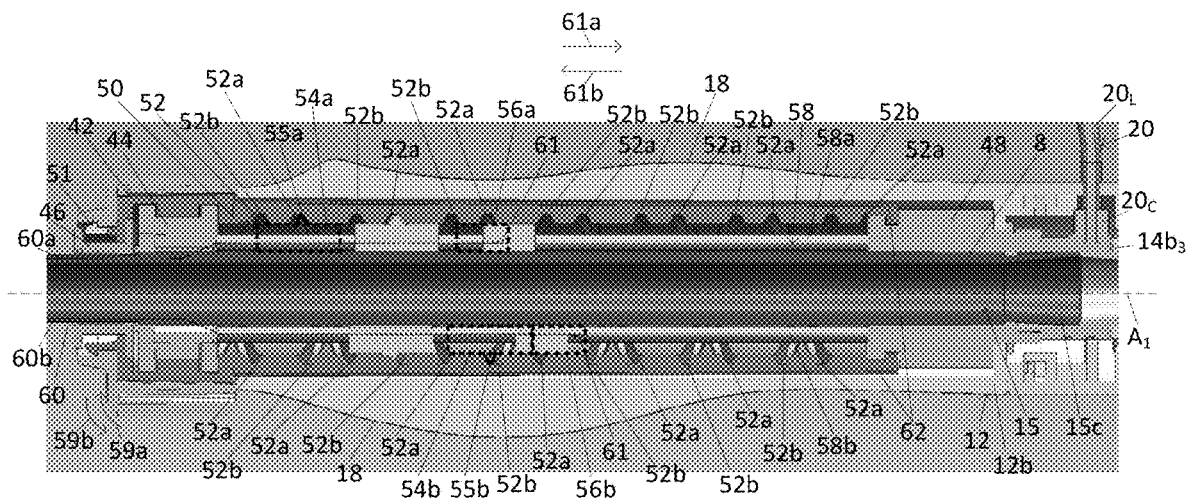

FIG. 6C illustrates a variation of the steering system of FIG. 6A when the catheter is deflected in a second direction.

Figure 6D:
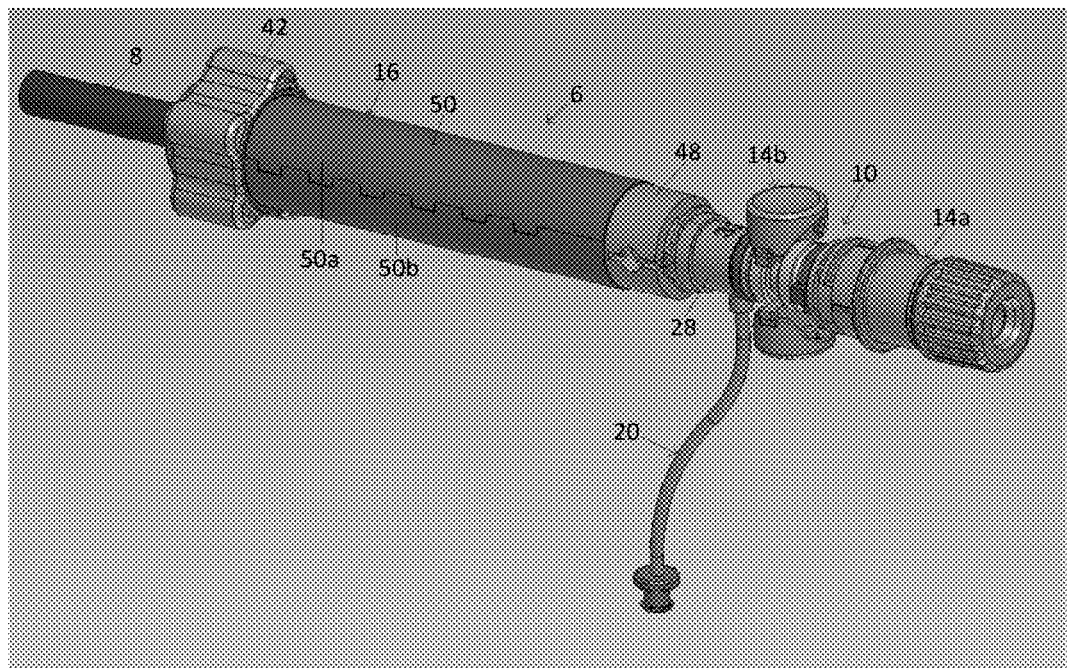

FIG. 6D illustrates the system of FIG. 1A with the housing shown transparent.

Figure 6E:
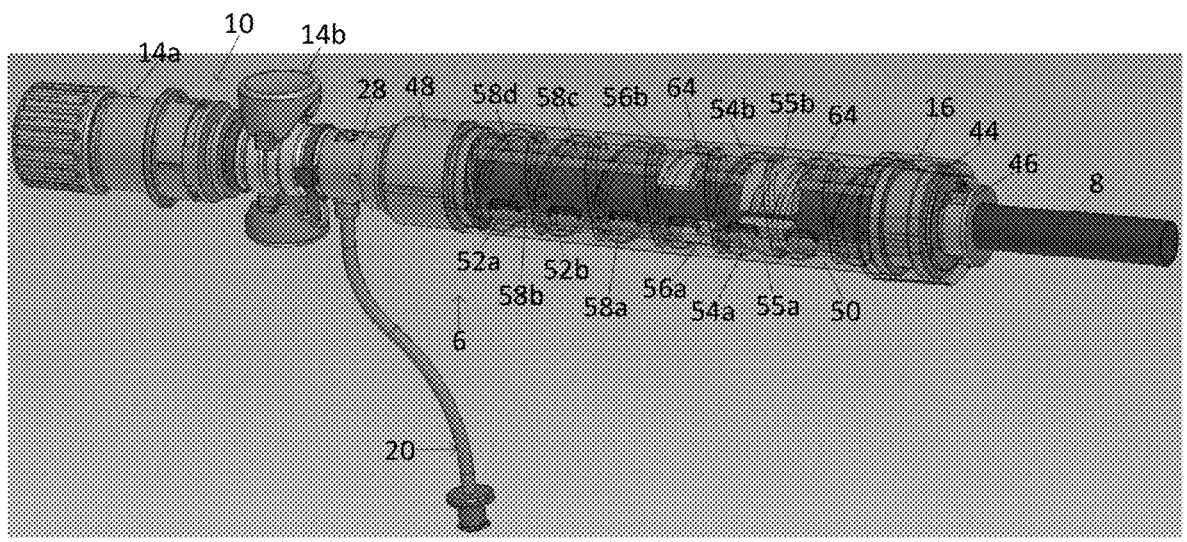

FIG. 6E illustrates the system of FIG. 1A with the housing shown fully transparent and with a variation of a rotator shown partially transparent.

Figure 6F:
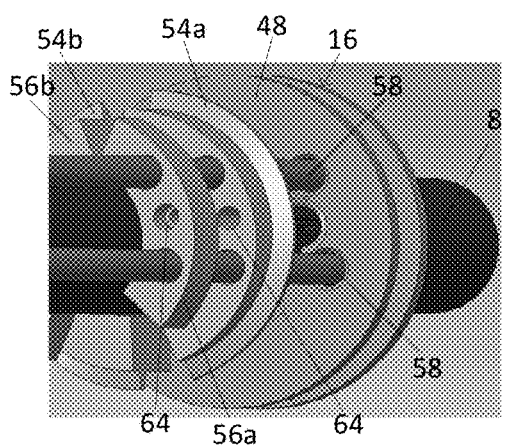

FIG. 6F illustrates a variation of drivers and sliders of the steering system of FIG. 6A.

DETAILED DESCRIPTION

The features in FIGS. 1A-6F can be combined with each other in any combination.

FIG. 1A illustrates a variation of a system 6 having a sheath 8, a valve system 10, a steering system 16, or any combination thereof. For example, the system 6 can have the sheath 8 and the valve system 10 without the steering system 16, the system 6 can have the sheath 8 and the steering system 16 without the valve system 10, or as FIG. 1A shows, the system 6 can have the sheath 8, the valve system 10, and the steering system 16. The sheath 8 can be any tube, for example, an introducer tube, a steerable catheter, or a non-steerable catheter. The sheath 8 can be any size, including any diameter. For example, the sheath 8 can have a gauge from 3 French to 34 French (e.g., 3 French, 6 French, 24 French, 34 French). FIG. 1A illustrates, for example, that the sheath 8 can be a 30 French steerable guide catheter. FIG. 1A further illustrates that a lumen 15 can extend through the system 6, for example, through the sheath 8, the valve system 10, the steering system 16, or any combination thereof. The valve system 10 can separate the lumen 15 into multiple sections. The valve system 10 can separate the lumen 15 into one or multiple chambers. For example, the valve system 10 can compress one or multiple portions of the lumen 15 to create an openable and closeable chamber in the lumen 15.

The valve system 10 can be used, for example, to load devices into the sheath 8, to unload devices from the sheath 8, or both. The valve system 10 can advantageously inhibit or prevent fluid (e.g., blood and/or air) from entering and/or leaving the sheath 8 while a device is being loaded into the sheath 8, while a device is being used and is in the sheath 8, while a device is being unloaded from the sheath 8, or any combination thereof. For example, the valve system 10 can inhibit or prevent the introduction of air into the sheath 8 during loading. As another example, the valve system 10 can inhibit or prevent blood from leaking out of the sheath 8 during loading and unloading.

The valve system 10 can have one or multiple valves 14, for example, 1 to 3 or more valves 14, including every 1 valve increment within this range (e.g., 1 valve, 2 valves, 3 valves). For example, FIG. 1A illustrates that the valve system 10 can be a dual valve system having a first valve 14a and a second valve 14b. The first valve 14a can have a first valve control $14a_1$ and the second valve 14b can have a second valve control $14b_1$. The user can coordinate the opening and closing of the first and second valves 14a, 14b via the first and second valve controls $14a_1$, $14b_1$, respectively. The first and second valve controls $14a_1$, $14b_1$ can each comprise one or multiple moveable controls, including, for example, buttons, knobs, caps, sliders, and/or switches. For example, FIG. 1A illustrates that the first valve control $14a_1$ can be a rotatable knob or cap and that the second valve control $14b_1$ can comprise a second valve first control $14b_{1a}$ and a second valve second control $14b_{1b}$ such as two buttons. Turning the rotatable knob, for example, one revolution or less in first and second directions (e.g., clockwise and counterclockwise) can open and close the first valve 14a. Pushing the two buttons can temporarily close the second valve 14b to allow loading and unloading of devices into and from the first valve 14a. Depressing or letting go of the two buttons can allow the second valve 14b to passively re-open. FIG. 1A shows the first and second valves 14a, 14b in their fully open configurations.

The first and second valves 14a, 14b can seal the lumen 15 and can seal against one or multiple devices in the lumen 15. For example, the first and second valves 14a, 14b can be first and second clamps, respectively, that that can seal the lumen 15 and that can seal against one or multiple devices in the lumen 15. FIG. 1A illustrates, for example, that the first valve 14a can be a variable on and off valve and that the second valve 14b can be a normally open momentary valve that can be variably closed.

The first valve 14a can be, for example, a quick turn lock valve such that the first valve 14a can remain in any position that that the user leaves it in when the user lets go of the first valve control $14a_1$. This can allow the user to close the first valve 14a to zero (e.g., to a zero diameter) when nothing is in the lumen 15 and to close the first valve 14a onto any sized device in the lumen 15, for example, onto a guidewire, onto a suture, or even onto the full bore of the device that is being used. The first valve 14a can thus provide a variable sized seal, when fully closed, when fully open, and when in any intermediate position between fully closed and fully open.

The second valve 14b can be can be variably closed and can be biased to passively re-open when the user releases the second valve control $14b_1$. This can allow the user to close the second valve 14b to zero (e.g., to a zero diameter) when nothing is in the lumen 15 and to close the second valve 14b onto any sized device in the lumen 15, for example, onto a guidewire, onto a suture, or even onto the full bore of the device that is being used. By having the second valve 14b normally open when the user is not using the second valve control $14a_1$, the friction imparted on devices in the lumen 15 by the second valve 14b during loading, use, and/or unloading of the device can be eliminated or reduced.

When the first and second valves 14a, 14b are fully closed (e.g., to a zero diameter) and/or when the first and second valves 14a, 14b are closed on a device in the lumen 15, the seal created by the first and second valves 14a, 14b can be a fluid tight seal or a non-fluid tight seal. The fluid tight seal can prevent liquid and/or gas from passing through the seal that is created in first and second directions, for example, distally toward the sheath 8 and proximally away from the sheath 8.

The opening and closing of the first and second valves 14a, 14b can be coordinated during loading and unloading (1) to reduce or eliminate blood loss from the sheath 8 during loading and unloading, (2) to reduce or eliminate introducing air into the patient via the sheath 8 which could create an air embolism and patient injury, or both (1) and (2). For example, when a device is loaded into the lumen 15 through the first valve 14a, the second valve 14b can be in a closed configuration. Once the device is loaded into the first valve 14a and the first valve 14a has a seal around the device, the second valve 14b can be opened. The device can then be distally advanced in the lumen 15 to load the device into the sheath 8. When a device is being unloaded from the lumen 15 through the first and second valves 14a, 14b, the second valve 14b can be clamped down on the device as the device is being withdrawn through the first and second valves 14a, 14b. As the device is being withdrawn through the first and second valves 14a, 14b and the second valve 14b is clamped down on the device, the first valve 14a can be open or the first valve 14a can also be clamped down on the device. Once the device is fully withdrawn through the second valve 14b, the second valve 14b can be closed, for example, until the first valve 14a has a seal around the device or until the first valve 14a is closed, after either of which the second valve 14b can be opened again.

FIG. 1A further illustrates that the first valve 14a can be proximal the second valve 14b but any relative arrangement is appreciated (e.g., the positions of the first and second valves 14a, 14b can be swapped with each other).

FIG. 1A further illustrates that the first valve 14a can have a first valve port $14a_p$ for the loading and unloading of devices into and out of the first valve 14a. The first valve port $14a_p$ can always be open, can have a constant size, and can be positioned proximal the valve portion of the first valve 14a. As another example, the first valve port $14a_p$ can be openable and closeable, for example, via a shudder, a door system, or with a removably attachable plug. The first valve port $14a_p$ can function as an initial guide when loading devices into the sheath 8. The first valve port $14a_p$ can be the proximal-most port of the valve system 10. When both the first and second valves 14a, 14b are open, the first valve port $14a_p$ can define the proximal terminal end of the lumen 15.

FIG. 1A further illustrates a variation of a steering system 16. Where the sheath 8 is not steerable, the system 6 may not have the steering system 16. Where the sheath 8 is steerable, the sheath 8 can have a deflectable section (e.g., a deflectable distal section) so that the sheath 8 can be navigated through body lumens (e.g., blood vessels, lumens of the digestive tract, etc.). The deflectable section can be deflectable via the steering system 16, for example, in first and second directions (e.g., in two opposing directions such as left and right). The steering system 16 can comprise, for example, pull wires (e.g., two pull wires 180 degrees apart, such as two pull wires on opposite sides of the lumen 15) to make a softer distal section deflect left or right, although any steering mechanism is appreciated and within the scope of this disclosure. The steering system 16 can have one or multiple steering controls 42. As shown in FIG. 1A, the steering control 42 can be a rotatable knob that is rotatable clockwise, for example, to pull a first pull wire and that is rotatable counterclockwise, for example, to pull a second pull wire, although any catheter steering control is appreciated. The sheath 8 can have a single lumen or multiple lumens.

FIG. 1A further illustrates that the system 6 can have a fluid system 20 comprising a fluid line $20_L$ and a fluid line connector $20_C$. The fluid system 20 can be used to purge gas (e.g., air) from the lumen 15. For example, the fluid system 20 can allow the user to purge gas from the lumen 15 before introducing a device through the first valve 14a, before introducing a device through the second valve 14b, or before introducing a device through the first and second valves 14a, 14b. As another example, FIG. 1A illustrates that the fluid system 20 can allow the user to purge gas from the section of the lumen 15 that is distal the valve system 10, from the section of the lumen 15 between the first and second valves 14a, 14b, or both. In this way, gas can be purged from the portion of the lumen in sheath 8, from the portion of the lumen 15 in the valve system 10, from the portion of the lumen 15 in the steering system 16, or any combination thereof.

FIG. 1A further illustrates that the system 6 can have a handle 12 (also referred to as a housing). The handle 12 can have the sheath 8, the valve system 10, the steering system 16, or any combination thereof. The valve system 10 can be integrated with, attached to, or removably attached to the handle 12. The steering system 16 can be integrated with, attached to, or removably attached to the handle 12. The handle 12 can have one or multiple ergonomic portions 18 to provide a better feel and improved intuitive handling of the valve system 10 and/or the steering system 16 during use. The ergonomic portions 18 can make the valve system 14 and/or the steering system 16 fit better in the user's hand or hands and/or can encourage the user to hold the handle the same way each time during a procedure, thereby making the system 6 easier to operate by making the system 6 more comfortable and familiar to the user.

Figure 1B:
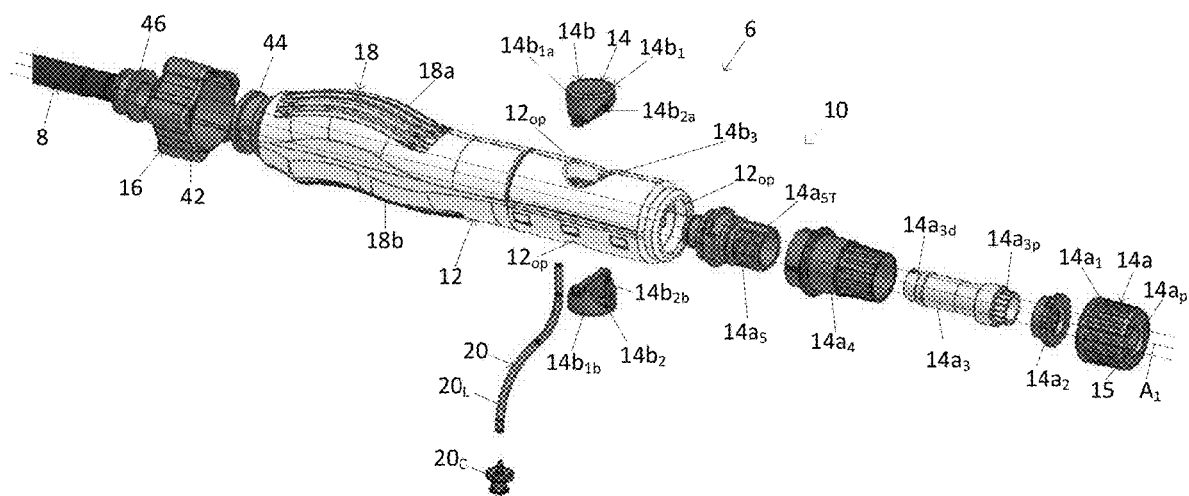
FIG. 1B illustrates a variation of an exploded view of some of the parts of the system shown in FIG. 1A.

FIG. 1B illustrates exemplary components and features of the sheath 8, the valve system 10, and the steering system 16 of FIG. 1A.

For example, FIG. 1B illustrates that the first valve 14a can comprise the first valve control $14a_1$, a control lock $14a_2$, a first valve compressor $14a_3$ (also referred to as the compressor $14a_3$) a twist cap $14a_4$, and a twist body $14a_5$, or any combination thereof. When the first valve 14a is in an assembled configuration (e.g., as shown in FIG. 1A), the first valve control $14a_1$ can be engaged with the control lock $14a_2$, the compressor $14a_3$ can be engaged with the control lock $14a_2$ and the twist body $14a_5$ (e.g., a compressor proximal end $14a_{3p}$ can be engaged with the control lock $14a_2$ and a compressor distal end $14a_{3d}$ can be engaged with the twist body $14a_5$), the first valve control $14a_1$ can be engaged with the twist cap $14a_{c4}$, the twist cap $14a_{c4}$ and the twist body $14a_{c5}$ can be engaged with one another, or any combination thereof.

FIG. 1B further illustrates that the components of the first valve 14a can have various features to facilitate such an assembly (e.g., threads, teeth, ridges, grooves, channels, clips, glue, welds, heat seals, etc.). Although various attachment features and methods of attachment are described herein, any attachment feature or method to connect the components shown and/or described is appreciated. For example, FIG. 1B illustrates that the first valve control $14a_1$ can have internal grooves, that the control lock $14a_2$ can have external ridges and internal grooves, that the compressor proximal end $14a_{3p}$ can have teeth, that the compressor distal end $14a_{3d}$ can have protrusions, or any combination thereof. When the first valve 14a is in an assembled state (e.g., as shown in FIG. 1A), the external teeth of the control lock $14a_2$ can engage with the internal grooves of the first valve control $14a_1$, and the internal grooves of the control lock $14a_2$ can engage with the teeth on the compressor proximal end $14a_{3p}$. When the first valve 14a is in an assembled state (e.g., as shown in FIG. 1A), the teeth on the compressor proximal end $14a_{3p}$ can engage with the internal grooves of the control lock $14a_2$ and the protrusions on the compressor distal end $14a_{3d}$ can be engaged with the twist body $14a_5$.

FIG. 1B further illustrates that the twist cap $14a_4$ can have external ridges and internal threads $14a_{4T}$ (e.g., shown in FIG. 1E), and that the twist body $14a_5$ can have external threads $14a_{5T}$. When the first valve 14a is in an assembled state (e.g., as shown in FIG. 1A), the external ridges on the twist cap $14a_4$ can engage with the internal grooves of the first valve control $14a_1$. When the first valve 14a is in an assembled state (e.g., as shown in FIG. 1A), the internal threads $14a_{4T}$ of the twist cap $14a_4$ can be engaged with the external threads $14a_{5T}$ of the twist body $14a_5$ such that the twist cap $14a_4$ can be in rotatable engagement with the twist body $14a_5$. To close the first valve 14a, the compressor proximal end $14a_{3p}$ can be twisted relative to the compressor distal end $14a_{3d}$ or vice versa, for example, by rotating the first valve control $14a_1$.

FIG. 1B further illustrates that the second valve 14b can have the second valve control $14b_1$ (e.g., the two buttons), one or multiple engagers $14b_2$, a second valve compressor $14b_3$ (also referred to as the compressor $14b_3$), or any combination thereof. The engagers $14b_2$ can be attached to or integrated with the second valve control $14b_1$. For example, FIG. 1B illustrates that a second valve first engager $14b_{2a}$ can extend from the second valve first control $14b_{1a}$, that a second valve second engager $14b_{2a}$ can extend from the second valve second control $14b_{1b}$, or any combination thereof. The engagers $14b_2$ can engage with the compressor $14b_3$. To close the second valve $14b$, the engagers $14b_2$ can be forced into the compressor $14b_3$ to compress or collapse the compressor $14b_3$, for example, by pressing the second valve first and second controls $14b_{1a}$, $14b_{1b}$ toward each other. FIG. 1B further illustrate that the surface of the engagers $14b_2$ that contacts the compressor $14b_3$ can be flat. As another example, the surfaces can be curved.

FIG. 1B further illustrates that the housing 12 can have housing openings $12_{op}$ to accommodate portions of the valve system 10 that the user can engage or interact with. For example, FIG. 1B illustrates that the housing 12 can have three housing openings $12_{op}$ for the two valves 14 shown in FIG. 1A.

FIG. 1B further illustrates that the lumen 15 can have a lumen center longitudinal axis $A_1$ that can extend from the first valve port $14a_p$ into the sheath 8, for example, to the distal terminal end of the sheath 8. FIG. 1B further illustrates that the portion of the lumen center longitudinal axis $A_1$ that extends through the housing 12 can be straight. As another example, the portion of the lumen center longitudinal axis $A_1$ that extends through the housing 12 can be curved.

FIG. 1B further illustrates that the lumen 15 (e.g., schematically defined by the two dashed lines on each side of the lumen center longitudinal axis $A_1$) can extend through the various components shown in FIG. 1B. FIG. 1B further illustrates that the portion of the lumen 15 that extends through the handle 12 can be straight. As another example, the portion of the lumen 15 that extends through the handle 12 can be curved. As shown in FIG. 1B, the lumen 15 can have a constant radius. As another example, the lumen 15 can have multiple sections, with each section having a different radius. As yet another example, the lumen 15 can be tapered.

FIG. 1B further illustrates that the steering system 16 can comprise the steering control 42, a first mount 44, and a spacer 46. The steering control 42 can be mounted to a rotator (not shown) which can be mounted to the first mount 44. Turning the steering control 42 can turn the rotator. The spacer 46 can provide space between the steering control 42 and the sheath 8 so that when the steering control 42 is used (e.g., rotated), the steering control 42 does not contact the sheath 8 and can rotate relative to the first mount 44. The spacer 46 can also provide space between the steering control 42 and the first mount 44.

Figure 1C:
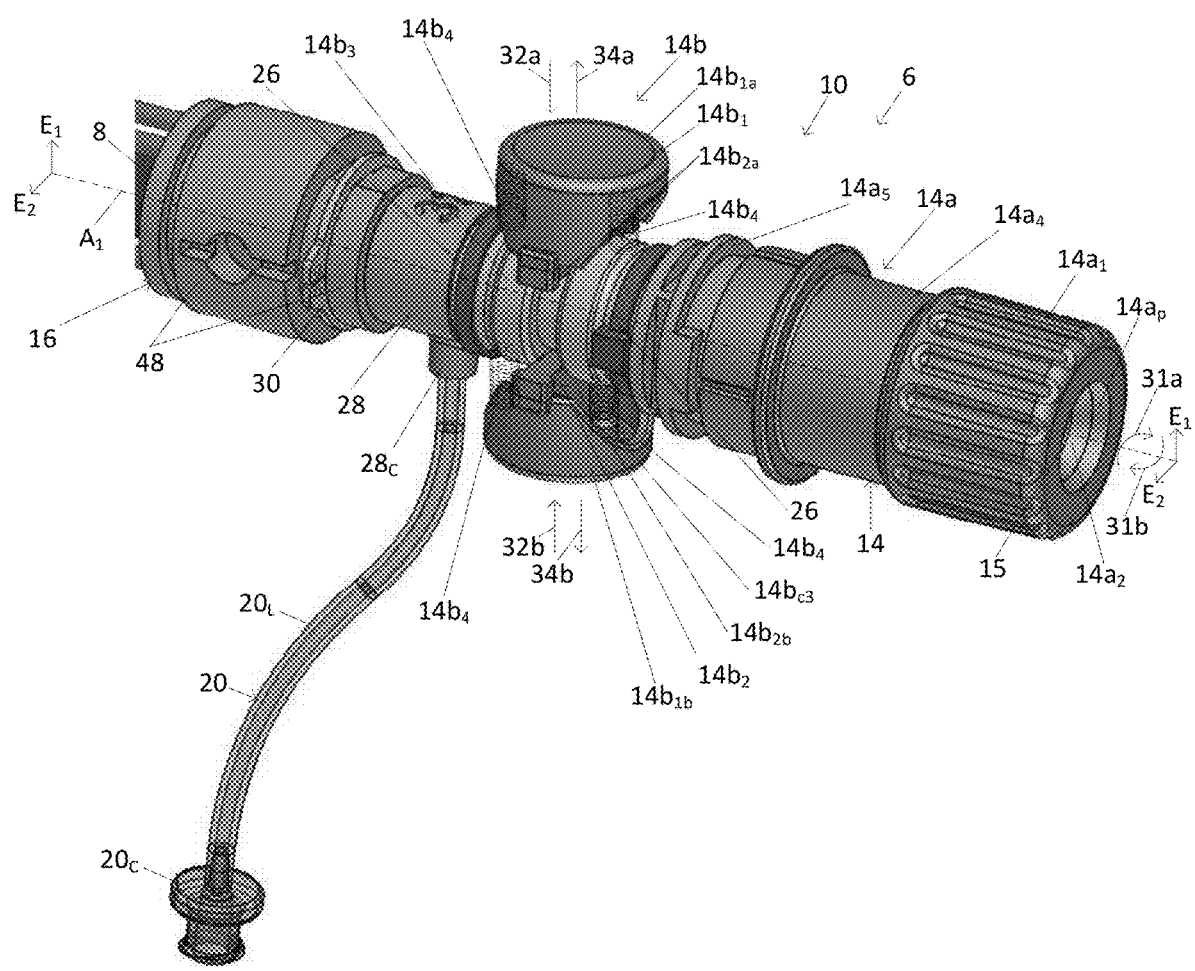
FIG. 1C illustrates a variation of the valve system of FIG. 1A. The housing is shown transparent for illustrative purposes only.

FIG. 1C illustrates a variation of the first and second valves 14a, 14b in an assembled configuration. The housing 12 is shown transparent for illustrative purposes only. FIG. 1C illustrates, for example, that the valve system 10 and the steering system 16 in FIGS. 1A and 1B in an assembled configuration with the housing 12 shown transparent for illustrative purposes. As another example, the housing 12 can be transparent so that the user can see devices in the lumen 15. A transparent housing 12 can advantageously provide the user with visual cues as to when to open and close the valves 14 of the valve system 10, for example, by allowing the user to see where the device is located in the lumen 15 relative to the valves 14 of the valve system 10 (e.g., relative to the first and second valves 14a, 14b) during loading, use, and/or unloading.

FIG. 1C further illustrates a variation of the second valve compressor $14b_3$ and that the second valve $14b$ can have springs $14b_4$. The second valve compressor $14b_3$ can be a flexible tube. The compressor $14b_3$ can be, for example, a molded piece of elastomer. The compressor $14b_3$ can be made of a flexible or otherwise deformable material to facilitate such compression and expansion. For example, the compressor $14b_3$ can be made from a fluoroelastomer and expanded polytetrafluoroethylene (ePTFE) combination, which is further described in U.S. patent application Ser. No. 15/891,024 filed Feb. 7, 2018 (now U.S. Publication No. 2018/0344981) and which is herein incorporated by reference in its entirety for any purpose.

The compressor $14b_3$ can be secured to a fitting on each end via a coupler 26. The couplers 26 can keep compressor $14b_3$ from leaking and can be, for example, zip ties. FIG. 1C further illustrates that the second valve controls 14 can have one or multiple protrusions $14b_5$ (also referred to as bosses). A first end of the springs $14b_4$ can sit on the protrusions $14b_5$. The protrusions $14b_5$ can hold the springs $14b_4$ in place and keeps the springs $14b_4$ from getting dislodged. A second end of the springs $14b_4$ can sit on the compressor $14b_3$ (e.g., on the compressor as shown or on protrusions or recesses on the compressor surface). The springs $14b_4$ can bias the second valve controls $14b_1$ to be in the open position, can bias the compressor $14b_3$ to be in an open configuration, or both. Thus, as shown in FIG. 1C, the springs $14b_4$ can bias the second valve $14b$ to be normally open. FIG. 1C illustrates an exemplary arrangement of springs and protrusions $14b_4$, $14b_5$, where the second valve $14b$ has four springs $14b_{c4}$ and each second valve control $14b_1$ has two protrusions $14b_5$, but any number of springs $14b_4$ is appreciated, for example, 1 to 4 or more springs. In FIG. 1C, portions of the second valve controls $14b_1$ and portions of the compressor $14b_3$ are shown transparent for illustrative purposes only so that all four springs $14b_4$ can be seen. As FIG. 1C shows, two of the springs $14b_4$ can be for the second valve first control $14b_{1a}$ and two of the springs $14b_4$ can be for the second valve second actuator $14b_{1b}$.

When the user presses the second valve controls $14b_1$ (e.g., buttons), the springs $14b_4$ can compress against the compressor $14b_3$, and when the user releases the second valve controls $14b_1$ (e.g., buttons), the springs $14b_4$ can push the second valve controls $14b_1$ outward so the second valve $14b$ is always open. As shown in FIG. 1C, the engagers $14b_2$ squeeze the compressor $14b_3$ shut (e.g., by squeezing a first side into a second side) when the second valve controls $14b_1$ are squeezed together. When the second valve controls $14b_1$ are released, the springs $14b_3$ can push the second valve controls $14b_1$ back out and the compressor $14b_3$ can open up naturally, with or without also being pulled open by the springs $14b_4$. There can be a hard surface (e.g., hard plastic) under the portion of the compressor $14b_3$ that the various springs $14b_4$ can push against. The springs $14b_4$ can be, for example, compression springs (e.g., close wrapped for the last two wraps, then open pitch for 0.5 inches), but any type of spring is appreciated (e.g., torsion springs).

FIG. 1C further illustrates for example, that the compressor $14b_3$ can be compressed by pressing the second valve first and second controls $14b_{1a}$, $14b_{1b}$ in first and second directions 32a, 32b, respectively, and that the compressor $14b_3$ can be expanded by releasing the second valve first and second controls $14b_{1a}$, $14b_{1b}$, after which the springs $14b_4$ can push the second valve first and second controls $14b_{1a}$, $14b_{1b}$ in first and second directions 34a, 34b, respectively.

Directions $32a$ and $32b$ can be opposite each other. Directions $34a$ and $34b$ can be opposite each other. The springs $14b_4$ can be biased to return to their uncompressed configuration (e.g., the configuration shown in FIG. 1C) such that when the user releases the second valve controls $14b_1$, the springs $14b_4$ can passively return the second valve controls $14b_1$ to their neutral position (e.g., the positions shown in FIG. 1C), and thereby allow the compressor $14b_3$ to passively re-open.

FIG. 1C further illustrates that the first valve control $14a_1$ can be moved (e.g., rotated) in a first direction $31a$ and in a second direction $31b$ to open and close the first valve $14a$, respectively. The first direction $31a$ can be opposite the second direction $31b$. For example, the first direction $31a$ can be clockwise rotation and the second direction $31b$ can be counterclockwise rotation, or vice versa. When the first valve control $14a_1$ is rotated in the first direction $31a$, the compressor $14a_3$ can be twisted closed via relative rotational movement between the compressor proximal and distal ends $14a_{3p}$, $14a_{3d}$. When the first valve control $14a_1$ is rotated in the second direction $31b$, the compressor $14a_3$ can be untwisted open via relative rotational movement between the compressor proximal and distal ends $14a_{3p}$, $14a_{3d}$. To facilitate such compression and expansion, the first valve compressor $14a_3$ can be a flexible tube. The compressor $14a_3$ can be, for example, a molded piece of elastomer. The compressor $14a_3$ can be made of a flexible or otherwise deformable material to facilitate such compression and expansion, including, for example, a fluoroelastomer and expanded polytetrafluoroethylene (ePTFE) combination, which is further described in U.S. patent application Ser. No. 15/891,024 filed Feb. 7, 2018 (now U.S. Publication No. 2018/0344981), and which was incorporated by reference above in its entirety for any purpose.

FIG. 1C further illustrates that the second valve $14b$ can be between the first valve $14a$ and an adapter $28$. For example, FIG. 1C illustrates that the compressor $14b_3$ can be between the twist body $14a_{c5}$ and the adaptor $28$. A first end of the compressor $14b_3$ can be connected to the twist body $14a_5$ and a second end of the compressor $14b_3$ can be connected to the adaptor $28$, for example, via the couplers $26$. A portion of the tube $14b_{c1}$ can fit in the twist body $14a_4$ (e.g., as shown in FIG. 1C), or vice versa. A portion of the tube $14b_{c1}$ can fit in the adapter $28$ (e.g., as shown in FIG. 1C), or vice versa.

FIG. 1C further illustrates that the adapter $28$ can couple the valve system $10$ to the sheath $8$ and/or to the steering system $16$. The sheath $8$ can terminate before distal the adapter $28$, can terminate inside the adapter $28$, or can pass through the adapter $28$, for example, into the first and/or second valves $14a$, $14b$.

The adapter $28$ can have a coupler $28_C$. The coupler $28_C$ can be in fluid communication with the lumen $15$ such that when the fluid line $20_L$ is coupled to the coupler $28_C$, the fluid system $20$ can be in fluid communication with the lumen $15$. The fluid system $20$ can purge air from the system $6$.

FIG. 1C further illustrates that the steering system $16$ can comprise a second mount $48$. The second mount $48$ can be proximal the first mount $44$ such the second mount $48$ is closer to the valve system $10$ than the first mount $44$. The second mount $48$ can be coupled to the adapter $28$. A retaining ring $30$ can retain the second mount $48$ on the adapter $28$. The second mount $48$ can have first section and a second section, with the first section having a larger width (e.g., diameter) than the second section. A distal end of the adapter $28$ can fit in the second mount $48$. As will be described in further detail below, the first and second mounts $44$, $48$ can be non-rotatable such that a rotator of the steering system $16$ can be rotated relative to the first and second mounts $44$, $48$ when the steering control $42$ is rotated.

Figure 1D:
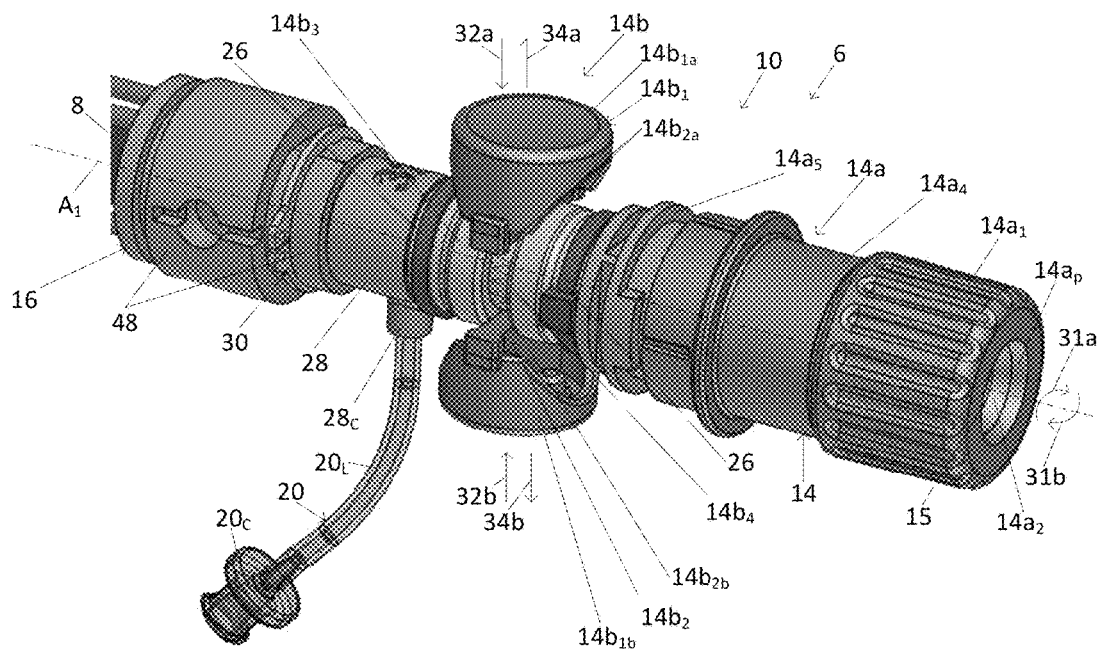
FIG. 1D illustrates another variation of a valve system. The housing is shown transparent for illustrative purposes only.

FIG. 1D illustrates that the spring $14b_4$ can be integrated in the wall of the compressor $14b_3$ and/or can be attached to an external surface of the compressor $14b_3$. The spring $14b_{c2}$ can extend around the perimeter (e.g., circumference) of the tube $14b_{c1}$, for example, one or multiple times. As another example, the spring $14b_4$ can extend partially around the perimeter (e.g., circumference) of the compressor $14b_3$ such that the spring $14b_4$ only extends partially around the perimeter (e.g., less than a full perimeter) of the compressor $14b_3$. The spring $14b_4$ can be made of any deformable material or structure. The spring $14b_4$ can be, for example, made of a shape memory material such as Nitinol. The spring $14b_4$ can be, for example, a braid, a mesh, or a coil in the wall and/or on a surface of the compressor $14b_3$. As another example, the compressor $14b_3$ can be made of an elastic material that can return to the open configuration without the need for the separate springs $14b_4$ as shown in FIGS. 1C and 1D. The housing $12$ is shown transparent in FIG. 1D for illustrative purposes only.

Figure 1E:
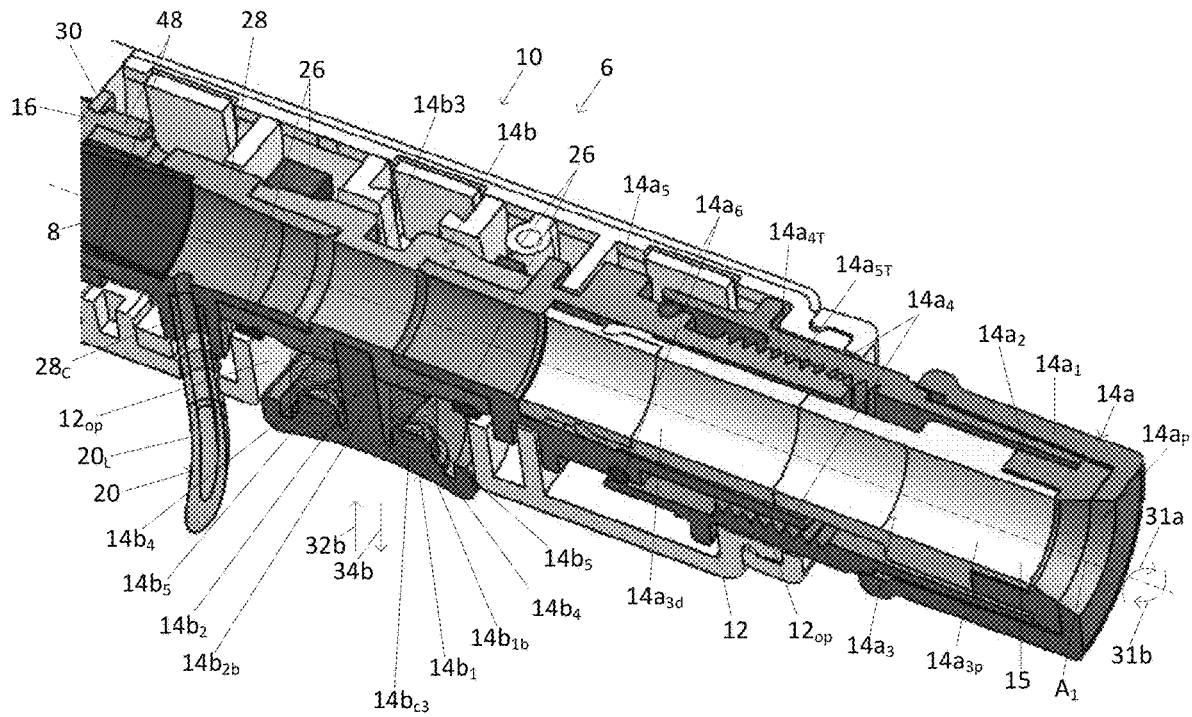
FIG. 1E illustrates a variation of a cross-section view of the valve system of FIG. 1C through the lines $E_1$-$E_1$ and $E_2$-$E_2$ in FIG. 1C, and also shows a variation of the housing in which the valve system can sit.

FIG. 1E illustrates a variation of the system $6$ in an assembled configuration when the first and second valves $14a$, $14b$ are both fully open. FIG. 1E further illustrates that the twist cap $14a_4$ of the first valve $14a$ can have internal threads $14a_{4T}$. The internal threads $14a_{4T}$ of the twist cap $14a_{c3}$ can be engaged with the external threads $14a_{5T}$ of the twist body $14a_{c4}$. When the first valve control $14a_1$ is turned by the user, the first valve control $14a_1$, the control lock $14a_2$, and the twist cap $14a_4$, can turn in unison about the twist body $14a_5$ via the threaded engagement of the internal threads $14a_{4T}$ of the twist cap $14a_4$ with the external threads $14a_{5T}$ of the twist body $14a_5$. The compressor proximal end $14a_{3p}$ can connected to the control lock $14a_2$ and the compressor distal end $14a_{3d}$ can be attached to a distal end of the twist body $14a_5$. When the first valve control $14a_1$ is turned by the user, the twist body $14a_5$ and the compressor distal end $14c_{3d}$ can remain stationary while the first valve control $14a_1$ is being turned. In this way, when the first valve control $14a_1$ is turned by the user, the first valve control $14a_1$, the control lock $14a_2$, the twist cap $14a_4$, and the compressor proximal end $14a_{3p}$ can be turned relative to both the twist body $14a_5$ and the compressor distal end $14a_{3d}$. The relative rotational movement between the compressor proximal and distal ends $14a_{3p}$, $14a_{3d}$ when the first valve control $14a_1$ is turned can cause the compressor $14a_3$ to close via twisting (e.g., clockwise rotation of the first valve control $14a_1$) and to open via untwisting (e.g., counter clockwise rotation of the first valve control $14a_1$). For example, a middle portion of the compressor $14a_3$ between the compressor proximal and distal ends $14a_{3p}$, $14a_{3d}$ can be twisted and untwisted by rotating the first valve control $14a_1$ in first and second directions $31a$, $31b$. To move the first valve $14a$ from a fully open position (e.g., from a non-twisted position) to a fully closed position without any device in the lumen $15$ can be accomplished, for example, with a partial turn, a single turn, or multiple turns of the first valve control $14a_1$.

FIG. 1E further illustrates that the first valve $14a$ can have a gasket $14a_6$. The gasket $14a_6$ can be a compressible gasket such as a compressible O-ring. The gasket $14a_6$ can provide the user with a soft tactile feel when turning the first valve control $14a_1$. When the user rotates the first valve control $14a_1$ having the gasket $14a_6$, the user can feel a dampened consistency such that it does not feel like rotating two hard surfaces (e.g., plastic on plastic). As another example, the gasket $14a_6$ can keep the compressor $14a_3$ from untwisting. The gasket $14a_6$ can provide friction that is greater than the untwisting force of the compressor $14a_3$ to keep the first valve $14a$ in whatever position the user leaves it in. The gasket $14a_6$ can advantageously lock the first valve control $14a_1$ in any position that the user leaves it in, so that the first valve $14a$ cannot untwist when you let go of the first valve control $14a_1$. With the gasket $14a_6$, the first valve $14a$ can be a variable on and off valve. Without the gasket $14a_6$, the first valve $14a$ can be a normally open, momentary valve such that once the user lets go of the first valve control $14a_1$, the compressor $14a_3$ can untwist, returning the first valve $14a$ to a fully open configuration. Thus, the gasket $14a_6$ can provide the user a soft or dampened feel while rotating the first valve control $14a_1$, can provide resistance so that the compressor $14a_3$ will not untwist itself, or both.

FIG. 1E further illustrates that the lumen 15 can pass through the sheath 8, the valve system 10 (e.g., through the first and/or second valves $14a$, $14b$), the housing 12, the steering system 16, or any combination thereof.

FIG. 1E further illustrates that the lumen 15 can be defined by the sheath 8, the adapter 28, the compressor $14b_3$, the twist body $14a_5$, the compressor $14a_3$, the control lock $14a_2$, the first valve actuator $14a_1$, or any combination thereof. FIG. 1E illustrates, for example, that an internal surface of these components can define the lumen 15.

FIG. 1E further illustrates that the second valve controls $14b_1$ can contact the compressor $14b_3$ (e.g., via the engagers $14b_2$) when the second valve $14b$ is in the normally open position (e.g., fully open position).

FIG. 1E further illustrates that the surfaces of the portions of the components defining the lumen 15 can be coated with a friction-reducing coating (e.g., a hydrophilic coating) to reduce the friction on one or more of the surfaces. For example, the inner surface of the portions of the compressors $14a_3$ and $14b_3$ that define the lumen 15 can be coated with such a material.

Although various components are shown separate from each other in FIGS. 1A-1E, any combination of the features and/or components shown in FIGS. 1A-1E can be combined or integrated with each other in any combination as desired.

Figure 2A:
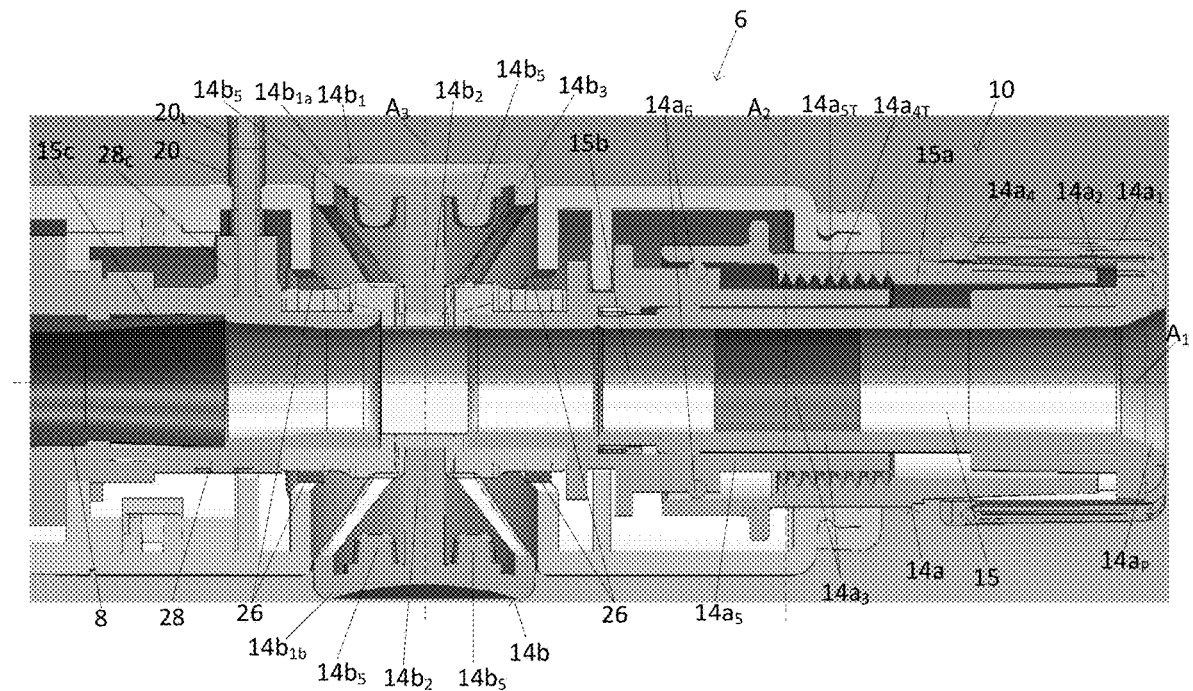
FIG. 2A illustrates a variation of a cross-section view through the line A-A in FIG. 1A and shows a variation of fully open configurations of a variation of two valves.
Figure 2B:
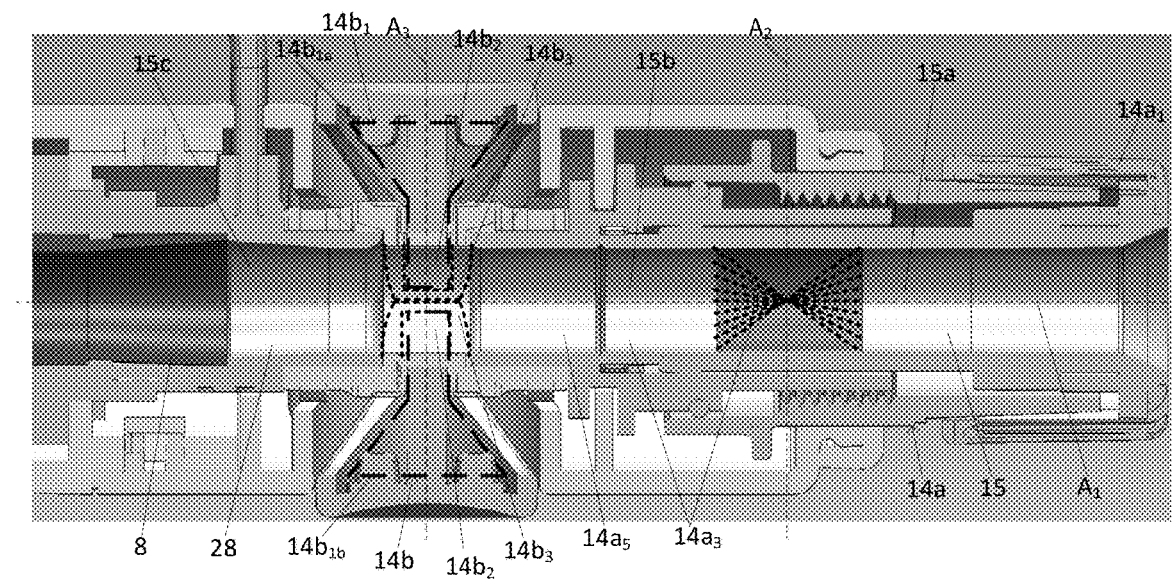
FIG. 2B illustrates a variation of fully closed configurations of the two valves of FIG. 2A.
Figure 2C:
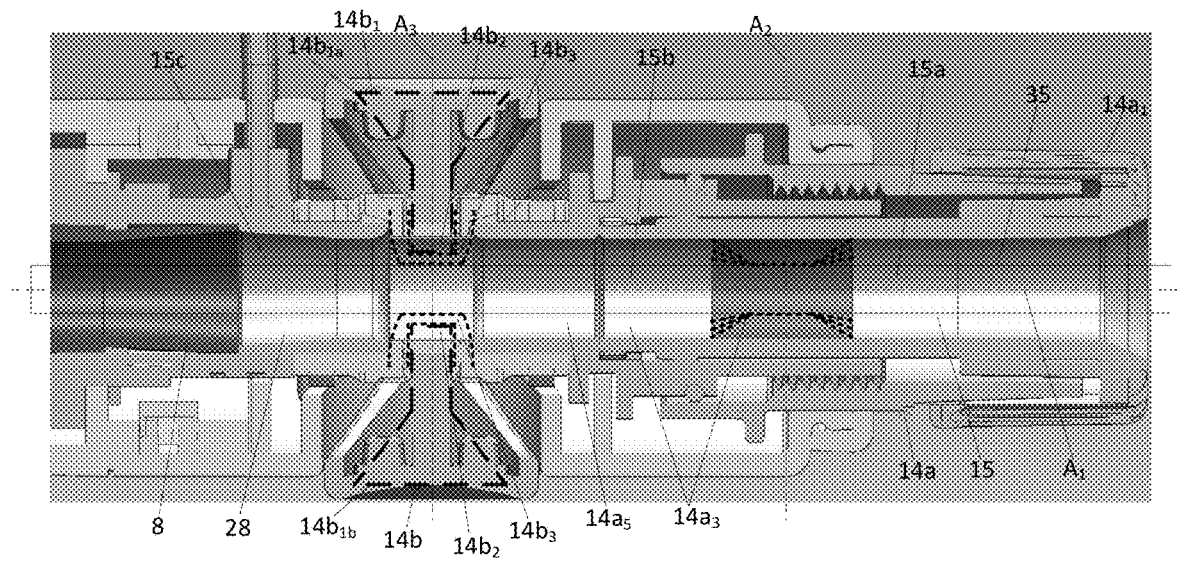
FIG. 2C illustrates a variation of the two valves of FIG. 2A closed against a device.

FIGS. 2A-2C illustrate variations of various open and closed configurations of the first and second valves $14a$, $14b$. For illustrative purposes only, the springs $14b_4$ are shown transparent in FIGS. 2A-2C, and for illustrative purposes only, all the labels in FIG. 2A are not carried through to FIGS. 2B and 2C.

FIG. 2A illustrates a variation of a fully open configuration of the first and second valves $14a$, $14b$.

FIG. 2B illustrates a variation of a fully closed configuration of the first and second valves $14a$, $14b$. The fully closed configuration is represented by the dashed lines in FIG. 2B, and is shown superimposed over the fully open configuration to show the relative positions of the first and second valves $14a$, $14b$ in the fully closed configuration relative to the fully open configuration. The first valve $14a$ can be fully closed, for example, when no device is in the portion of the lumen 15 that passes through the first valve $14a$. When the first valve $14a$ is in a fully closed configuration, the first valve $14a$ can close against itself to create a seal, for example, by being twisted shut via the first valve controller $14a_1$. The second valve $14b$ can be fully closed, for example, when no device is in the portion of the lumen 15 that passes through the second valve $14b$. When the second valve $14b$ is in a fully closed configuration, the second valve $14b$ can close against itself to create a seal, for example, by being forced shut via the second valve controllers $14b_1$. FIG. 2B illustrates that the first valve $14a$ can clamp down on a first portion of the lumen 15 and that the second valve $14b$ can clamp down on a second portion of the lumen 15. The seals shown in FIG. 2B can prevent or inhibit fluid from going past the valve that is closed in either direction.

FIG. 2C illustrates a variation of a partially closed configuration of the first and second valves $14a$, $14b$. The first and second valves $14a$, $14b$ can be partially closed to any position between the fully open configuration shown in FIG. 2A and the fully closed configuration shown in FIG. 2B. FIG. 2C illustrates, for example, that the first and second valves $14a$, $14b$ can be partially closed, for example, against a device 35 in the lumen 15. The exemplary partially closed configuration represented by the dashed lines in FIG. 2C, and is shown superimposed over the fully open configuration to show the relative positions of the first and second valves $14a$, $14b$ in a partially closed configuration relative to the fully open configuration. The first valve $14a$ can be partially closed against a device (e.g., the device 35), for example, when the device is in the portion of the lumen 15 that passes through the first valve $14a$. When the first valve $14a$ is closed against a device (e.g., the device 35), the first valve $14a$ can create a seal around the device, for example, by being twisted partially closed against the device via the first valve controller $14a_1$. The second valve $14b$ can be partially closed against a device (e.g., the device 35), for example, when the device is in the portion of the lumen 15 that passes through the second valve $14b$. When the second valve $14b$ is closed against a device (e.g., the device 35), the second valve $14b$ can create a seal around the device, for example, by being partially closed against the device via the second valve controllers $14b_1$. FIG. 2C illustrates that the first valve $14a$ can clamp down on a first portion of the lumen 15 and that the second valve $14b$ can clamp down on a second portion of the lumen 15. The seals shown in FIG. 2C can prevent or inhibit fluid from going past the valve that is closed in either direction.

FIGS. 2A-2C illustrate, for example, that the first and second valve compressors $14a_3$, $14b_3$ can each have a fully open configuration (e.g., FIG. 2A), a fully closed configuration (e.g., FIG. 2B), and any partially closed configuration therebetween (e.g., FIG. 2C), where a partially closed configuration can be, for example, any closed configuration of the compressors $14a_3$ and $14b_3$ against a device in the lumen 15. The partially closed configurations can create a seal against the device, inhibiting or preventing fluid from flowing past the valve 14 that is in the partially closed configuration.

FIGS. 2A-2C illustrate that the first and second valves $14a$, $14b$ can be opened and closed in any combination, including, for example, (1) first valve fully open and second valve fully open, (2) first valve fully open and second valve partially closed (e.g., closed against a device), (3) first valve fully open and second valve fully closed, (4) first valve partially closed (e.g., closed against a device) and second valve fully open, (5) first valve partially closed (e.g., closed against a device) and second valve partially closed (e.g., closed against a device), (6) first valve partially closed (e.g., closed against a device) and second valve fully closed, (7) first valve fully closed and second valve fully open, (8) first valve fully closed and second valve partially closed (e.g., closed against a device), (9) first valve fully closed and second valve closed, or any combination thereof. A fully closed configuration can be, for example, any sealed configuration of the first and second valves $14a$, $14b$ when no device is in the portion of the lumen 15 passing through the first and second valves 14a, 14b. A partially closed configuration can be, for example, any sealed configuration of the first and second valves 14a, 14b when one or multiple devices are in the portion of the lumen 15 passing through the first and second valves 14a, 14b. The first and second valves 14a, 14b can also be opened and operated in in partially open (e.g., not fully open) configurations.

FIGS. 2A-2C further illustrate that the valve system 10 can the split the lumen 15 into sections, for example, a lumen first section 15a proximal the first valve 14a (e.g., proximal an axis $A_2$ of the first valve 14a), a lumen second section 15b between the first and second valves 14a, 14b (e.g., between the axis $A_2$ and an axis $A_3$ of the first and second valves, respectively), a lumen third section 15c distal the second valve 14b (e.g., distal the axis $A_3$ of the second valve 14b), or any combination thereof. The axes $A_2$ and $A_3$ can be, for example, center transverse axes of the compressors $14a_3$ and $14b_3$, respectively. The axes $A_2$ and $A_3$ can be perpendicular to the lumen center longitudinal axis $A_1$.

FIGS. 2A-2C further illustrate that the valve system 10 can be used to open and close the lumen sections (e.g., lumen sections 15a, 15b, and 15c) relative to each other, for example, by opening and closing the valves 14. For example, when the first and second valves 14a, 14b are both open, the three lumen sections 15a, 15b, and 15c can be connected, for example, as shown in FIG. 2A. When the first and second valves 14a, 14b are both closed, the three lumen sections 15a, 15b, and 15c can be separated (e.g., sealed) from each other, for example, as shown in FIGS. 2B and 2C. When the first valve 14a is open and the second valve 14b is closed (e.g., fully closed or sealed against a device), the lumen first and second sections 15a, 15b can be connected to each other and sealed from the lumen third section 15c. When first valve 14a is closed (e.g., fully closed or sealed against a device) and the second valve 14b is open, the lumen second and third sections 15b, 15c can be connected to each other and sealed from the lumen first section 15a. Thus, the valve system 10 can adjustably split the lumen 15 into sections by the user opening and closing the first and second valves 14a, 14b to selectively clamp down on the lumen 15.

FIGS. 2A-2C further illustrate that the first valve 14a can be a first port of the lumen second section 15b and that the second valve 14b can be a second port of the lumen second section 15b such that the first and second valves 14a, 14b can together function as a single two-port valve. By selectively opening and closing the first and second valves 14a, 14b, the first and second ports can be opened and closed to load and unload devices from the sheath 8. For example, for loading, the first and second ports can be selectively opened and closed to pass devices through the first port, through the lumen second section 15b, and then through the second port, where the opening and closing of the first and second ports can be coordinated such that at least one of the ports can always be sealed (e.g., fully closed or against a device) to prevent or inhibit blood from leaking out of the lumen 15 during loading. For unloading, the first and second ports can be selectively opened and closed to pass devices through the second port, through the lumen second section 15b, and then through the first port, where the opening and closing of the first and second ports can be coordinated such that at least one of the ports can always sealed (e.g., fully closed or against a device) to prevent or inhibit blood from leaking out of the lumen 15 during unloading. The valve system 10 can thereby advantageously define an openable and closeable chamber (e.g., the lumen second section 15b) to load, to unload, and/or to use devices (e.g., the device 35) while in the lumen 15 to inhibit or prevent blood loss from the lumen 15. FIGS. 2A-2C illustrate, for example, that when the second valve 14b is closed, the lumen first and second sections 15a, 15b can be sealed from the blood flow via the closure of the second valve 14b. FIGS. 2A-2C further illustrate, for example, that when the first valve 14a is closed, the lumen first section 15a can be sealed from the blood flow via the closure of the first valve 14a.

FIGS. 2A-2C thus illustrate that the lumen second section 15b can function like a submarine chamber, where during loading, the user can keep the second valve 14b closed while the first valve 14a is open, and where during unloading, the user can close the second valve 14b while a device is being pulled out of the lumen 15. With the second valve 14b closed, the user can open the first valve 14a without leaking blood or with leaking only leaking a small volume of blood when the first valve 14a is opened so the user can exchange devices since when the second valve 14b is closed, the lumen first and second sections 14a, 14b can be temporarily sealed from the blood flow via the closure of the second valve 14b. FIGS. 2A-2C illustrate for example, that the opening and closing of the first and second valves 14a, 14b can be coordinated to limit the blood loss. When there is no device in the lumen second section 15b, the maximum blood loss can be limited to the volume of the lumen second section 15b. When there is a device (e.g., the device 35) in the lumen second section 15b, the maximum blood loss can be further limited to the volume of the lumen second section 15b less the volume of the portion of the device in the lumen second section 15b.

For example, where the sheath 8 is inserted into a vasculature system (e.g., arterial and/or venous vessels) with the first valve 14a closed and the second valve 14b open and a device (e.g., the device 35) is then loaded into the lumen 15 by first closing the second valve 14b and then opening the first valve 14a, the maximum blood loss can be limited to the volume of blood that is in the lumen second section 15b when the first valve 14a is opened.

As another example, where the sheath 8 is in a vasculature system (e.g., arterial and/or venous vessels) with the first valve 14a closed and the second valve 14b open and a device (e.g., the device 35) in the lumen 15, the device can then unloaded from the lumen 15 by withdrawing the device from the lumen third section 15c into the lumen first and second sections 15a, 15b. When the device is withdrawn from the lumen third section 15c and is in the lumen second and third sections 15b, 15c, the second valve 14b can be fully closed such that when the when the first valve 14a is opened to fully withdraw the device from the lumen 15, the maximum blood loss can be limited to the volume of the lumen second section 15b less the volume of the portion of the device in the lumen second section 15b at the time the first valve 14a is opened.

FIGS. 2A-2C further illustrate that the compressors $14a_3$ and $14b_3$ can have enough flexible or compressible material to close down and seal against any sized device, from very small (e.g., a guidewire) to the full bore of the lumen 15 (e.g., a therapy catheter). For example, the compressor $14a_3$ can have enough wall material to it so that if the user has a very small wire and they twist the first valve control $14a_1$, the amount of wall material of the compressor $14a_3$ is sized such that it can compress and fully go around the wire, or if the user has a very large device in the lumen, the wall of the compressor $14a_3$ can seal around that as well. As another example, the compressor $14b_3$ can have enough wall material to it so that if the user has a very small wire and they push the second valve controls $14b_1$ together, the amount of wall material of the compressor $14b_3$ is sized such that it can compress and fully go around the wire, or if the user has a very large device in the lumen, the wall of the compressor $14b_3$ can seal around that as well. The compressors $14a_3$ and $14b_3$ can thus be designed to seal against any size device in the lumen 15 to prevent from having blood just blowing by. This can be beneficial when using multiple devices as well, as physicians will commonly use more than one catheter at the same time, potentially coming out of the same sheath (e.g., the sheath 8). For example, the user may want to use a larger device such as a guide catheter, and on the outside of the guide catheter can be another catheter or wire, and then there can be another shaft that might be a balloon. In such a case, there can be multiple different round devices coming out of one main valve. The first valve 14a can seal against the outside of all of these devices, for example, bringing them toward the center, and still allow slideable motion into and out of the sheath 8. FIG. 2C illustrates, for example, that when the first and second valves 14a, 14b are closed against one or multiple devices, that that the first and second valves 14a, 14b can still allow slideable motion of the one or multiple devices in the lumen 15, for example, slideable motion to advance devices in the sheath 8, slideable motion to withdraw devices from the sheath 8, or both.

FIGS. 2A-2C further illustrate that when the compressors $14a_3$ and $14b_3$ are closed against a device, that the material can of the compressors $14a_3$ and $14b_3$ can resist outward expansion while the compressors $14a_3$ and $14b_3$ are being compressed against a device and can resist outward expansion when in a compressed configuration (e.g., a sealed configuration) against a device. Thus, FIGS. 2A-2C further illustrate, for example, that the radial expansion of the compressors $14a_3$ and $14b_3$ can be prevented or limited (e.g., from about 0.00 mm to about 2.00 mm, from about 0.20 mm to about 2.00 mm, etc., although any range is appreciated) to advantageously keep the lumen 15 from blowing out or getting bigger when a device (e.g., the device 35) is being brought through the valves 14 (e.g., through the first and second valves 14a, 14b).

FIGS. 3A-3J illustrate exemplary loading and unloading procedures using the first and second valves 14a, 14b. FIGS. 3A-3F illustrate exemplary loading procedures. FIGS. $3G_1$-3J illustrate exemplary unloading procedures, with FIGS. $3G_1$, $3H_1$, 3I, and 3J illustrating a first variation of unloading procedures and with FIGS. $3G_2$, $3H_2$, 3I, and 3J illustrating a second variation of unloading procedures. The valves 14 of the valve system 10 can be opened in any combination and the device or devices in the lumen can be advanced into, used in, and withdrawn from the lumen 15 with the valves 14 in any configuration, although certain configurations, loading procedures (e.g., the sequence of opening and closing valves 14 during loading, such as illustrated in FIGS. 3A-3F), and unloading procedures (e.g., the sequence of opening and closing valves 14 during unloading, such as illustrated in FIGS. $3G_1$-3J) can provide certain benefits, such as reducing or preventing blood loss.

FIG. 3A illustrates that the sheath 8 can be inserted into a body lumen with the first valve 14a closed and the second valve 14b open. As additional examples, the sheath 8 can be inserted into a body lumen with the first valve 14a open and the second valve 14b closed or with both the first and second valves 14a, 14b closed.

FIG. 3B illustrates that the second valve 14b can be closed before opening the first valve 14a to load a device (e.g., the device 35) into the lumen 15.

FIG. 3C illustrates that after the first valve 14a is opened, a device (e.g., the device 35) can be loaded into the lumen 15 while the second valve 14b is closed.

FIG. 3D illustrates that once the device 35 is between the first and second valves 14a, 14b (e.g., in the lumen second section 15b), the first valve 14a can be closed against the device 35. FIG. 3D illustrates that when the first valve 14a is closed against the device, the seal created by the first valve 14a against the device can prevent blood from leaving the lumen 15 between the device and the first valve 14a.

FIG. 3E illustrates that once the first valve 14a is closed against the device 35, the second valve 14b can be opened.

FIG. 3F illustrates that the device 35 can be advanced in the lumen 15 while the first valve 14a is clamped against the device 35 and the second valve 14b is open. The device 35 can be advanced in and/or withdrawn from the lumen 15 (e.g., can be slideable in the lumen 15 toward and/or away from the distal end of the sheath 8) while the first and/or second valves 14a, 14b are clamped against the device 35. The first and/or second valves 14a, 14b can maintain the seal against the device as the device is advanced in the sheath 8. The first and/or second valves 14a, 14b can maintain the seal against the device as the device is withdrawn from the sheath 8. For example, FIG. 3F illustrates that a device (e.g., the device 35) can be slideable in the first valve 14a when the first valve 14a is sealed against the device 35. The first valve 14a can maintain the seal against the device as the device (e.g., the device 35) is advanced and withdrawn in the first valve 14a when the first valve 14a is closed against the device. 35. Blood can thereby be prevented from leaving the lumen 15 between the device and the first valve 14a as the device is advanced or withdrawn in the lumen 15. For example, FIG. 3F illustrates that the first valve 14a can prevent blood from leaving the lumen 15 as the device 35 is advanced in the lumen 15. Once the device is fully advanced to the target site (e.g., at the distal terminal end of the sheath 8), the device 35 can be used while the first valve 14a remains clamped against the device 35.

FIG. $3G_1$ illustrates that when the device 35 is withdrawn from the lumen 15, the first and second valves 14a, 14b can be closed against the device 35. The device 35 can be withdrawn from the lumen 15 while the first and/or second valves 14a, 14b are clamped against the device 35. For example, FIG. $3G_1$ thus illustrates that a device (e.g., the device 35) can be slideable in the second valve 14b when the second valve 14b is sealed against the device 35. The second valve 14b can maintain the seal against the device as the device (e.g., the device 35) is advanced and withdrawn in the second valve 14b when the second valve 14b is closed against the device. 35. Blood can thereby be prevented from leaving the lumen 15 between the device and the second valve 14b as the device is advanced or withdrawn in the lumen 15. For example, FIG. $3G_1$ illustrates that the second valve 14b can prevent blood from leaving the lumen 15 as the device 35 is withdrawn from the lumen 15. Thus, FIG. $3G_1$ illustrates that when the second valve 14b is closed against the device, the seal created by the second valve 14b against the device can prevent blood from leaving the lumen 15 between the device and the second valve 14b.

FIG. $3G_2$ illustrates that when the device 35 is withdrawn from the lumen 15, the first valve 14a can be open and the second valve 14b can be closed against the device 35. The device 35 can be withdrawn from the lumen 15 while the first valve 14a is open and the second valve 14b is clamped against the device 35.

FIG. $3H_1$ illustrates that when the device 35 is withdrawn from the lumen 15 while the first and second valves 14a, 14b are clamped against the device 35, the second valve 14b can be fully closed once the device 35 is between the first and second valves 14a, 14b (e.g., in the lumen second section 15b).

FIG. $3H_2$ illustrates that when the device 35 is withdrawn from the lumen 15 while the first valve 14a is clamped against the device 35 and the second valve 14b is open, the second valve 14b can be fully closed once the device 35 is between the first and second valves 14a, 14b (e.g., in the lumen second section 15b).

FIG. 3I illustrates that the first valve 14a can be fully closed (e.g., from the partially closed configuration shown in FIG. $3H_1$ or from the fully open configuration shown in FIG. $3H_2$) once the device 35 is proximal the first valve 14a (e.g., is in the lumen second section 15b). FIG. 3I further illustrates that the second valve 14b can be kept fully closed until the first valve 14a is fully closed.

FIG. 312 illustrates that the first valve 14a can be fully closed once the device 35 is proximal the first valve 14a (e.g., is in the lumen second section 15b). FIG. $3I_1$ further illustrates that the second valve 14b can be kept fully closed until the first valve 14a is fully closed.

FIG. 3J illustrates that the second valve 14b can be opened once the first valve 14a is closed. The next device can then be loaded and unloaded (e.g., according to the method illustrated in FIGS. 3A-3J) or the sheath 8 can be withdrawn from the body lumen.

Although FIGS. 3A-3J illustrate loading and unloading a single device in the lumen 15, multiple devices can be loaded into and unloaded from the lumen 15 using the valve system 10, sequentially and/or simultaneously. For example, for sequential loading, a first device can be loaded into the lumen 15 and then a second device can be loaded into the lumen 15 over or next to the first device. For example, FIGS. 3A-3J illustrate that the device 35 can be a first device. Once the first device is loaded into the lumen 15 and in the lumen third section 15c, the second valve 14b can be closed and the first valve 14a can be opened to load a second device over or next to the first device. As another example, for simultaneous loading, a first device and a second device can be loaded into the lumen 15 at the same time. The second device can be inside (e.g., in a lumen) of the device 35 shown in FIGS. 3A-3J, where the valves 14 can close against the outer most device (e.g., the device 35), or the first and second devices can be next to each other in the lumen (e.g., neither device is inside the other device).

For example, a procedure for using the system 6 can involve loading the sheath 8 over a guidewire sticking out of a patient, where the sheath 8 can have a tapered dilator inside. The tapered dilator can be tapered, for example, from the guidewire size up to whatever the size of the full bore of the sheath 8. When the tapered dilator is removed, once the taper of the dilator starts to come out of the first valve 14a, if the user continues to pull the dilator out without closing the first valve 14a or the second valve 14b, blood can start rushing out as the diameter is reduced (e.g., because of the taper). If the user does this (e.g., because it is a conventional device without a two valve system or because the user forgets to use the valve system 10) and blood starts rushing out, the user can then rotate the first valve control $14a_1$ to close down the internal diameter of the compressor $14a_3$ against the dilator to stop blood from leaking out of the lumen 15. Using the system 10, however, can limit or prevent blood loss. For example, once the tapered portion of the dilator begins to pass through the second valve 14b, the user can squeeze down on the second valve controls $14b_1$ (e.g., buttons). By closing the second valve 14b when the tapered portion begins to pass through the second valve 14b, the user can advantageously seal the lumen 15 more distal than the proximal opening (e.g., the opening $14a_p$), so at the point that the user is squeezing down on the buttons, the user can now pull the dilator all the way out without any blood leaking. Where the user cannot see when the tapered portion starts to enter the second valve 14b (e.g., where the housing 12 is opaque), one technique would be to start to squeeze the buttons before the taper, for example, when the full diameter section of the tapered dilator is in the second valve 14b, and then the user can feel the buttons moving closer together when the dilator starts to get smaller as the user is withdrawing the dilator. The user can thereby continue to press the second valve controls $14b_1$ together as the taper reduces back to its smallest size. In this way, the normally open second valve 14b can also provide the user with tactile feedback during unloading, indicating to the user, for example, the size of the device that is in the second valve 14b. As another example, the user can close the first valve 14a and let go of the buttons and blood will not leak either.

When it is time to introduce a device after the tapered dilator is removed, the user can close the second valve (e.g., by squeezing the buttons again) while the user opens up the first valve 14a, and then again, blood flow can be prevented because the user is blocking the blood more distal the first valve by closing the second valve 14b. The user can then introduce whatever next device they are going to put in (e.g., therapy catheter). If the user wants to just leave the sheath 8 in place over the guidewire (e.g., without introducing another device after removing the dilator), then the user can close the first valve 14a (e.g., by rotating the twist valve) onto the guidewire until it is sealed, and then the user can let their fingers off the buttons, allowing the second valve to re-open. Thus, while the second valve controls $14b_1$ (e.g., buttons) can be opened and closed at any time, two exemplary times the second valve controls $14b_1$ (e.g., buttons) are activated is when the user entering or leaving the lumen 15 with a device.

FIGS. 3A-3J further illustrate the benefit of having both the first and second valves 14a, 14b. For example, if the valve system 10 just has the second valve 14b (e.g., without the first valve 14a), there may be a point in time when the valve system 10 is not closed to the pressure of the blood in the lumen 15 so that if the user were to unload (e.g., pull) a device from the lumen 15 or were to load a device into the lumen 15, the user may have to just time the squeezing of the buttons when they see blood start to rush out during unloading and may have to time things correctly and act quickly during loading to minimize blood loss. For example, if the device being pulled out has a taper (e.g., such as a tapered dilator), the user can be squeezing on the taper by squeezing the buttons as the device is pulled out and so may be able to get the device out without much blood loss with the right technique with a valve system 10 with only a second valve 14b. As another example, if the user wants to load a device using a valve system 10 with just a second valve 14b, there can be a very short period of time, for example, when the user introduces a device that has a blunt end though the second valve 14b when the user lets their fingers off the button valve to open it and push the device in that the blood is allowed to flow out. Whatever period of time the second valve 14b is open in such a situation, some pressurized blood can flow out around and past the device, particularly when the device the user is inserting is not round and/or does not fill the entire lumen 15. Having the first valve 14a in addition to the second valve 14b can advantageously decrease or prevent such blood loss that can occur if the valve system 10 were to only have the second valve 14*b* by coordinating the opening and closing of the first and second valves 14*a*, 14 during loading and unloading as described herein (e.g., as shown in FIGS. 3A-3J). Thus, although a valve system 10 with just the second valve 14*b* (e.g., without the first valve 14*a*) can still provide benefits and limit blood flow out of the lumen 15 during loading and unloading, a two valve system 10 such as that shown in FIGS. 3A-3J can provide additional benefits.

FIGS. 3A-3J further illustrate that where the valve system 10 has multiple valves 14, the valves 14 can be operated independently from each other. For example, FIGS. 3A-3J illustrate that the first and second valves 14*a*, 14*b* can be independently controlled. The first valve 14*a* can be selectively opened and closed independent of the second valve 14*b*, the second valve 14*b* can be selectively opened and closed independent of the first valve 14*a*, or both. For example, FIGS. 3A-3J illustrate that the first and second valves 14*a*, 14*b* can each independently open and/or close regardless of the state of the other valves 14 in the system 10. For example, when the first valve 14*a* is fully closed, partially closed, or open, the second valve 14*b* can be opened and closed as desired. As another example, where the second valve 14*b* is fully closed, partially closed, or open, the first valve 14*a* can be opened and closed as desired.

As another example, where the valve system 10 has multiple valves 14 (e.g., such as in FIGS. 3A-3J), the operation of one or more valves 14 in the system 10 can depend on the state of one or more other valves 14 in the system 10. For example, to assist in inhibiting or preventing blood loss during loading and/or unloading, the first valve 14*a* may only be able to be opened from a fully closed configuration when the second valve 14*b* is fully closed. This can be accomplished, for example, via a mechanical linkage between the first and second valves 14*a*, 14*b* that can have, for example, a locked configuration and an unlocked configuration.

The valve system 10 can be customizable. For example, while FIGS. 1A-3J illustrate two exemplary valves 14 of the valve system 10, the valve system 10 can incorporate any number of valves and any type of valve designs, including, for example, momentary valves, variable valves, normally open valves, normally closed valves, passive valves, active valves, or any combination thereof. Active valves can require some sort of user input via a valve control to open and/or close the valve, whereas passive valves can open and/or close without any user input. A valve can be active and passive. For example, the second valve 14*b* can be actively closed via the two buttons and can passively re-open when the two buttons are released. The valves 14 (e.g., the first and second valves 14*a*, 14*b*) can be any type of valve having an open configuration and a closed configuration. FIGS. 1A-3J illustrate, for example, that the valves 14 can be pinch valves but any type of valve is appreciated.

Where the valve system 10 has only one valve, the one valve can be, for example, the first valve 14*a* or the second valve 14*b*, or a different valve altogether. For a one valve system, any valve can be used, for example, such as only the first valve 14*a*, such as only the second valve 14*b*, etc. For example, the lumen of or to a sheath (e.g., catheter, introducer tubing, etc.) can be controlled with a valve system 10 having only one valve for loading and unloading. The one valve in such a system can be, for example, a twist valve (e.g., the first valve 14*a*) on the backend. For example, FIG. 4A illustrates an exemplary system 6 having only one valve 14. As shown in FIG. 4A, the one valve can be a twist valve, such as the twist valve shown as the first valve 14*a* in FIGS. 1A-3J.

Where the valve system 10 has multiple valves 14, the multiple valves can include, for example, the first and second valves 14*a*, 14*b*, or one or multiple other different valves. For example, for a two valve system such as shown in FIGS. 1A-3J, one of the valves can be the first valve (e.g., a twist lock valve) and the other valve can be any other valve (e.g., the second valve 14*b* as shown, or another twist lock valve). For example, the first and second valves 14*a*, 14*b* can both be twist lock valves. As another example, for a two valve system such as shown in FIGS. 1A-3J, one of the valves can be the second valve (e.g., the two button valve) and the other valve can be any other valve. Thus, the valve system 10 can be, for example, a combination of the second valve 14*b* in the position shown with any other valve in the more proximal position (e.g., in the position of the first valve 14*a*). For example, FIG. 4B illustrates another exemplary system 6 having two valves 14. As shown in FIG. 4B, both the valves can be a twist valve. The first valve 14*a* can be a twist valve and the second valve 14*b* can be twist valve. The twist valves shown in FIG. 4B can have the same or similar structure as the twist valve shown as the first valve 14*a* in FIGS. 1A-3J.

FIG. 5 illustrates that the system 6 can be modular or can have one or multiple modular portions such that different valves systems 10 can be removably attached to the sheath 8, such that different valves systems 10 can be removably attached to the handle 12, such that different valve systems 10 can be removably attached to the steering system 16, such that different steering systems 16 can be removably attached to the sheath 8, such that different steering systems 16 can be removably attached to the handle 12, such that different steering systems 16 can be removably attached to the valve system 10, or any combination thereof.

For example, FIG. 5 illustrates that the housing 12 can comprise a housing first end 12*a* and a housing second end 12*b*. The housing first end 12*a* can have the valve system 10 and the housing second end 12*b* can have the steering system 16. Either the housing first end 12*a* or the housing second end 12*b* can have the fluid system 20. The housing first end 12*a* with the valve system 10 can be removably attached to the housing second end 12*b*. Such a modular system can advantageously allow different housing portions having the same or different controls (e.g., the same or different valve system 10 as shown in FIG. 1A, the same or different steering system 16 as shown in FIG. 1A) to be attached to one another. This can improve the versatility of the sheath 8, can allow for greater customization, can enable users to use the valve system 10 they prefer or that is required for a particular procedure, can allow users to use multiple valve systems 10 during a procedure, or any combination thereof. For example, the first housing end 12*a* can be removed along with the valve system 10 from the housing second end 12*b* and a different housing first end 12*a* having a different valve system 10 (e.g., such as two twist lock valves) can then be removably attached to the same housing second end 12*b*. In such a case, the valve system 10 can be attached or integrated with the housing first end 12*a* such that by removing the housing first end 12*a*, the valve system 10 can also be removed. As another example, the valve system 10 or one or more valves 14 of the valve system 10 can be removably attached to the handle 12 such that different valves 14 or valve systems 10 (e.g., having a different number and/or arrangement of valves 14) can be removably and interchangeably attached to the handle 12 with or without also exchanging the housing first end 12a for a different housing first end. For example, the housing first end 12a can be removed from the handle 12, the valve system 10 can then be removed and another valve system 10 can be attached, and then the same or different housing first end 12a can be then attached.

FIG. 5 further illustrates that the housing first and second ends 12a, 12b can be removably attached to each another via one or multiple engagers 22. The engagers 22 can be any releasably lockable structure. For example, FIG. 5 illustrates that the engagers 22 can be one or multiple clips. The housing first and second ends 12a, 12b can be removed from each other by moving the engager 22 into a disengaged position (e.g., by pressing the clip). For example, when the engager 22 is pressed, the housing first end 12a and the system that it has (e.g., the valve system 10) can be detached from the housing second end 12b and the system that it has (e.g., the steering system 16), for example, along the detachment line 24 shown in FIG. 5. The valve and steering systems 10, 16 can be removably attached to the housing 12 such that the valve system 10 and/or the steering system 16 can be changed without having to also replace the housing 12. In such a case, to swap out different valves 14 or valve systems 10, for example, the engagers 22 (e.g., clips) can be disengaged, the housing first end 12a can be removed from the housing second end 12b, the valves 14 or valve system 10 can be removed from the system 6, different valves 14 or valve systems 10 (e.g., having a different number and/or arrangement of valves 14) can be attached to the system 6, and the housing first end 12a can be reengaged with the housing second end 12b via the engagers 22 (e.g., clips). Such modularity can advantageously allow various systems 6 to be formed by combining various combinations of variations of the valve and steering systems 10, 16, providing the user with various plug and play options and customization options.

Modularity can allow the system 6 to have any number and combination of valves 14. For example, the system 6 can have two valves 14 (e.g., as shown in FIGS. 1-3J, as shown in FIG. 4B), can just have one valve 14 such as the first valve 14a (e.g., as shown in FIG. 4A), such as the second 14b, or such as a variant of the first and/or second valves 14a, 14b, or any combination thereof (e.g., by swapping out different valves 14 and/or valve systems 14). As another example, the system 6 can have zero valves (e.g., the system 6 can have the steering system 16 with, for example, a luer on the back without the valve system 10). Both the first and second valves 14a and 14b are illustrated as active valves in FIGS. 1A-5, meaning that users need to put input on them for them to close and/or open. As another example, passive valves (e.g., silicon wafers) can be used alone or in combination with active valves.

A modular and/or customizable valve system 10 can advantageously allow the system to handle any valve configuration. The valve system 10 can be customized, for example, to just have a single diaphragm split cross-width valve that can be integrated with a housing first end 12a or that be attachable to a housing first end 12a. In such a case, the handle 12 can be shorter (e.g., compared to the length illustrated in FIG. 5), because the handle 12 can terminate, for example, where the buttons are shown on FIG. 5. A housing first end 12a having the single diaphragm split cross-width valve can be removably attached (e.g., snapped) to the housing second end 12b. The button valve can be replaced with, for example, any passive valve (e.g., a split valve like a duck bill valve, a cross-slit valve) so that the user does not have to think about or control two valves. Having a passive valve in the valve system 10 can help to protect against from blood leaking out without the user having to anything since it is a passive valve. As another example, a housing first end 12a having just a twist valve (e.g., just the first valve 12a) can be removably attached (e.g., snapped) to the housing second end 12b. As yet another example, a housing first end 12a having two twist valves (e.g., two twist valves 12a, such as shown in FIG. 4B) can be removably attached (e.g., snapped) to the housing second end 12b. As these examples demonstrate, a modular valve system 10 can offer the user with multiple plug and play options. The user can, for example, pick from available off the shelf options (e.g., available first end 12a options that have different valve systems 10) and the system can then be custom made according to the configuration that the user orders. Each different housing first end 12a can, for example, have a unique skew for each combination of valves 14 or arrangement of valves 14. The user or customer can select from the different valve options. For example, the user or customer can select the valve option from multiple standard configurations that work with the same housing second end 12b. Thus, the system 6 can be made to have just a single valve, multiple valves, or in other examples, can be made to have no valves at all and just have a luer attached on the back (e.g., on the housing first end 12a). The valve arrangement can be optimized, for example, based on the size (e.g., diameter) of the sheath 8, size (e.g., diameter) of the device size, or both, since blood loss out of smaller diameter sheath 8 (e.g., 6 French) will be less than out of larger diameter sheath 8 (e.g., 32 French).

FIG. 6A illustrates a variation of a steering system 16 for steering the sheath 8 when the sheath 8 is a steerable sheath. As FIG. 6A shows, the steering system 16 can have the steering control 42, the first mount 44, the spacer 46, the second mount 48, a rotator 50, drivers 54, sliders 56, rods 58, wires 60 (also referred to as pull wires), or any combination thereof. The steering control 42 can be attached to the rotator 50, for example, via a clip 51, such that rotating the steering control 42 rotates the rotator 50. As another example, the steering control 42 and the rotator 50 can be combined with each other. Using the steering control 42, the rotator 50 can be rotated in first and second directions (e.g., clockwise and counterclockwise) to selectively put the wires 60 in tension via the drivers and sliders 54, 56 to turn the distal tip of the sheath 8 in first and second directions (e.g., right and left).

The rotator 50 can be attached to the steering control 42, to the drivers 54, and to the first and second mounts 44, 48. The rotator 50 can be rotatably engaged with the first and second mounts 44, 48 such that the rotator 50 can rotate about the first and second mounts 44, 48 when the steering control 42 is turned. The sheath 8, the first mount 44, the second mount 48, the drivers 54, the sliders 56, and the rods 58 can be fixed such that they do not rotate when the rotator 50 is rotated. In this way, when the rotator 50 is rotated, the rotator 50 can rotate over the drivers and sliders 54, 56 to move the drivers and sliders 54, 56 longitudinally back and forth along the rods 58 to selectively apply and release tension from the wires 60. The rods 58 can be rigid. For example, the rods 58 can be made of carbon fiber. The rods 58 can be straight and/or curved. For example, FIG. 6A illustrates that the rods 58 can be straight. The drivers and sliders 54, 56 can have holes that the rods 58 can extend through. The drivers and sliders 54, 56 can slide on the rods 58.

The rotator 50 can be engaged with the drivers 54, and the drivers 54 can be releasably engageable with the sliders 56. When the rotator 50 is rotated, the rotator 50 can move the drivers 54 toward and away from the sliders 56, for example, to engage and disengage the drivers and sliders 54, 56 from each other. The drivers and sliders 54, 56 can ride on the rods 58 in first and second directions, where the rods 58 can be attached to the first and second mounts 44, 48 and can keep the drivers and sliders 54, 56 from rotating when the rotator 50 is rotated.

The steering system 16 can comprise first and second drivers 54a, 54b and first and second sliders 56a, 56b. The first driver 54a and the first slider 56a can be attached to one or multiple rods, for example, to a first rod 58a and to a second rod 58b (see FIG. 6E to see both the first and second rods 58a, 58b). The second driver 54b and the second slider 56b can be attached to one or multiple rods, for example, to a third rod 58c and to a fourth rod 58d (see FIG. 6E to see both the third and fourth rods 58c, 58d).

A first wire 60a can be attached to the first slider 56a and a second wire 60b can be attached to the second slider 56b. For example, FIG. 6A illustrates that a crimp 61 on a first end of the first and second wires 60a, 60b can attach the first and second wires 60a, 60b to the first and second sliders 56a, 56b, respectively. The second ends of the first and second wires 60a, 60b can be, for example, attached to a steerable section of the sheath 8 such as the distal tip of the sheath 8. The drivers and sliders 54, 56 can have holes that the wires 60 can extend through. For example, FIG. 6A illustrates that the crimps 61 can be in holes in the sliders 56. When the first wire 60a is put in tension, for example, by pushing the first slider 56a with the first driver 54a, the sheath 8 can be deflected in a first direction (e.g., to the right). When the second wire 60b is put in tension, for example, by pushing the second slider 56b with the second driver 54b, the sheath 8 can be deflected in a second direction, for example, opposite the first direction (e.g., to the left).

FIG. 6A illustrates exemplary relative positions of the drivers and sliders 54, 56 in a neutral configuration. The neutral configuration can correspond to when the sheath 8 has a straight or a non-curved configuration. When the drivers and sliders 54, 56 are in the neutral configuration, the first and second wires 60a, 60b can be in a non-tensioned state, can be in a relaxed configuration, can have nominal tension, or can have equal tension. The rotator 50 can move the drivers and sliders 54, 56 away from the neutral configuration, for example, to a first deflected configuration and to a second deflected configuration. When the drivers and sliders 54, 56 are in the first deflected configuration, the first slider 56a can releasably apply tension to the first wire 60a. When tension is applied to the first wire 60a, the sheath 8 can be deflected in a first direction (e.g., can be deflected to the right). When the drivers and sliders 54, 56 are in the second deflected configuration, the second slider 56b can releasably apply tension to the second wire 60b. When tension is applied to the second wire 60b, the sheath 8 can be deflected in a second direction (e.g., can be deflected to the left).

To selectively apply and release tension in the wires 60, the rotator 50 can be rotated in first and second directions 59a, 59b to selectively move the first and second drivers 54a, 54b toward and away from the first and second sliders 56a, 56b. When the rotator 50 is rotated, the rotator 50 can move the first and second drivers 54a, 54b in opposite directions. For example, FIG. 6A illustrates that the rotator 50 can simultaneously move the drivers 54 in opposite directions (e.g., directions 61a and 61b) to selectively engage with the sliders 56 one at a time. Thus, when tension is applied to the first wire 60a via the first slider 56a, the first driver 54a can be proximal the second driver 54b such that the first driver 54a is farther from the steering control 42 than the second driver 54b. When tension is applied to the second wire 60b via the second slider 56b, the second driver 54b can be proximal the first driver 54a such that the second driver 54b is farther from the steering control 42 than the first driver 54a. Whichever slider 56 is engaged with a driver 54 can put the wire 60 that is attached to that slider 56 in tension, which can cause the sheath 8 to deflect, for example, into the first and second deflected configurations.

FIG. 6A illustrates that when the rotator 50 is moved in the first direction 59a (e.g., clockwise direction), the drivers and sliders 54, 56 can be moved to a first deflected configuration via the rotator 50. When the drivers and sliders 54, 56 are in the first deflected configuration, the first driver 54a can be engaged with the first slider 56a, the first slider 56a can releasably apply tension to the first wire 60a (e.g., via the first driver 54a having pushed the first slider 56a to a more proximal position along the rods 58), the second driver 54b can be disengaged from the second slider 56b, the second slider 56b can be in a position that does not apply tension to the second wire 60b, and the second wire 60b can be in a non-tensioned state. The first deflected configuration can correspond to when the sheath 8 has a first curved configuration (e.g., when the tip is steered or bent to the right).

For example, FIG. 6A illustrates that when the drivers and sliders 54, 56 are in the neutral configuration and the rotator 50 is moved in the first direction 59a (e.g., clockwise direction), the rotator 50 can move the first driver 54a in the first direction 61a toward and into the first slider 56a such that the first driver 54a can push the first slider 56a in the first direction 61a along the rods 58. When the first slider 56a is pushed in the first direction 61a by the first driver 54a, the first slider 56a can pull the first wire 60a, thereby putting the first wire 60a in tension and causing the sheath 8 to deflect in a sheath first direction (e.g., to the right).

FIG. 6A further illustrates that when the rotator 50 is moved in the first direction 59a and the first slider 56a is being pushed by the first driver 54a in the first direction 61a, the rotator 50 can simultaneously move the second driver 54b in the second direction 61b. When the second driver 54b is moved in the second direction 61b, the second driver 54b and the second slider 56b can be decoupled from each other. This can advantageously allow the second slider 56b to come back on its own to the neutral configuration. Thus, as the second driver 54b is moved in the second direction 61b, the second slider 56b can remain in the position shown in FIG. 6A or can follow the second slider 54b in the second direction 61b (e.g., if the second slider 56b is pulled in the second direction 61b by the second wire 60b as the first wire 60a is placed in tension). The second direction 61b can be an opposite direction along the rods 58 than the first direction 61a.

FIG. 6A further illustrates that when the rotator 50 is moved in the second direction 59b (e.g., counterclockwise direction), the drivers and sliders 54, 56 can be moved to a second deflected configuration via the rotator 50. When the drivers and sliders 54, 56 are in the second deflected configuration, the second driver 54b can be engaged with the second slider 56b, the second slider 56b can releasably apply tension to the second wire 60b (e.g., via the second driver 54b having pushed the second slider 56b to a more proximal position along the rods 58), the first driver 54a can be disengaged from the first slider 56a, the first slider 56a can be in a position that does not apply tension to the first wire 60a, and the first wire 60a can be in a non-tensioned state. The second deflected configuration can correspond to when the sheath 8 has a second curved configuration (e.g., when the tip is steered or bent to the left).

For example, FIG. 6A illustrates that when the drivers and sliders 54, 56 are in the neutral configuration and the rotator 50 is moved in the second direction 59*b* (e.g., counterclockwise direction), the rotator 50 can move the second driver 54*b* in the first direction 61*a* toward and into the second slider 56*b* such that the second driver 54*b* can push the second slider 56*b* in the first direction 61*a* along the rods 58. When the second slider 56*b* is pushed in the first direction 61*a* by the second driver 54*b*, the second slider 56*b* can pull the second wire 60*b*, thereby putting the second wire 60*b* in tension and causing the sheath 8 to deflect in a sheath second direction (e.g., to the left).

FIG. 6A further illustrates that when the rotator 50 is moved in the second direction 59*b* and the second slider 56*b* is being pushed by the second driver 54*b* in the first direction 61*a*, the rotator 50 can simultaneously move the first driver 54*a* in the second direction 61*b*. When the first driver 54*a* is moved in the second direction 61*b*, the first driver 54*a* and the first slider 56*a* can be decoupled from each other. This can advantageously allow the first slider 56*a* to come back on its own to the neutral configuration. Thus, as the first driver 54*a* is moved in the second direction 61*b*, the first slider 56*a* can remain in the position shown in FIG. 6A or can follow the first slider 54*a* in the second direction 61*b* (e.g., if the first slider 56*a* is pulled in the second direction 61*b* by the first wire 60*a* as the second wire 60*b* is placed in tension).

Thus, when the rotator 50 is moved in the first direction 59*a* (e.g., clockwise direction), the first driver 54*a* can be moved into engagement with the first slider 56*a* and the second driver 54*b* can be disengaged from and/or can be moved away from the second slider 56*b*. When the rotator 50 is moved in the second direction 59*b* (e.g., counterclockwise direction), the second driver 54*b* can be moved into engagement with the second slider 56*b* and the first driver 54*a* can be disengaged from and/or can be moved away from the first slider 56*a*. From the neutral configuration shown in FIG. 6A, moving the rotator 50 in the first and second directions 59*a*, 59*b* can thus selectively apply tension to the first and second wires 60*a*, 60*b*, respectively. When the first and second wires 60*a*, 60*b* are in a tensioned state (e.g., when the drivers and sliders 54, 56 are in the first and second deflected configurations, respectively), moving the rotator 50 in the and second and first directions 59*b*, 59*a* can release the tension in the first and second wires 60*a*, 60*b*, respectively.

By rotating the rotator 50 via the steering control 42, the drivers and sliders 54, 56 can be moved to and from the various positions. For example, the drivers and sliders 54, 56 can be moved from the neutral configuration to the first deflected configuration, from the first deflected configuration to the neutral configuration, from the neutral configuration to the second deflected configuration, from the second deflected configuration to the neutral configuration, or any combination thereof. This can allow the user to steer the sheath 8 by deflecting the tip in the sheath first and second directions (e.g., left and right). When the drivers and sliders 54, 56 are in the first deflected configuration and the rotator 50 is moved in the second direction 59*b*, the rotator 50 can disengage the first driver 54*a* from the first sider 56*a*, which can allow the first wire 60*a* to return to a non-tensioned state. When the drivers and sliders 54, 56 are in the in the second deflected configuration and the rotator 50 is moved in the first direction 59*a*, the rotator 50 can disengage the second driver 54*b* from the second sider 56*b*, which can allow the second wire 60*b* to return to a non-tensioned state.

FIG. 6A thus illustrates that the sliders 56 can follow and/or get pushed by the drivers 54. For example, when tension is applied to the wires 60, the sliders 56 can get pushed by the drivers 54. When tension is released from the wires 56, the sliders 56 can be decoupled from the drivers 54 such that the sliders 56 can move independently of the drivers 54. This can advantageously allow the sliders 56 to come back on their own to the neutral configuration when the other direction is activated (e.g., when the rotator 50 is rotated in the other direction). Thus, when tension is released from a wire 60, the sliders 56 may or may not follow the drivers 54 as the drivers are moved in the opposite direction by the rotator 50.

The drivers and sliders 54, 56 can move independently of each other when the drivers 54 are moved distally (e.g., toward the steering control 42). The independent movement of the sliders 56 relative to the drivers 54 on the forward stroke (e.g., when the drivers 54 are moved away from the sliders 56 toward the steering control 42 when tension is released) can advantageously inhibit or prevent the wires 60 from getting crunched up in the back and distorted when tension is decreased and/or released from the wires 60. This is because when tension is released from the wires 60, the wires 60 can pull the sliders 56, not the other way around (e.g., the sliders 56 are not pushed into the wires 60 which could cause the wires 60 to bunch up). Thus, when the drivers 54 are on the rearward stroke (e.g., in direction 61*a*), the sliders 56 can be moved (e.g., pushed) by the drivers 54, and when the drivers 54 are on the forward stroke (e.g., in direction 61*b*), the sliders 56 can be moved (e.g., pulled) by the wires 60.

Having the sliders 56 decoupled from the drivers 54 on the rearward stroke can advantageously allow the wires 60 to naturally return to a neutral configuration and/or to naturally assume a relaxed configuration when the other wire is put in tension. Thus, movement of the sliders 56 on the forward stroke after the drivers 54 are decoupled can depend on the movement of the wire 60 that is attached to the sliders 56. The sliders 56 can move in any direction (e.g., in directions 61*a* and 61*b*) or remain in position when the drivers 54 are decoupled from the sliders 56. For example, if the wires 60 do not go forward (e.g., do not pull on the sliders 56), the sliders 56 may not go forward, and if the wires 60 do go forward (e.g., do pull on the sliders 56), the sliders 56 can go forward. For example, as tension is selectively applied and released to the first and second wires 60*a*, 60*b*, the first and second sliders 56*a*, 56*b* can be pushed via the first and second drivers 54*a*, 54*b* in direction 61*a*, respectively, and the first and second sliders 56*a*, 56*b* can be pulled via the first and second wires 60*a*, 60*b* in direction 61*b*, respectively. As tension is released from the wires 60, the wires 60 are attached to the sliders 56 (e.g., with a crimp 61), so the sliders 56 can be pulled forward (e.g., in direction 61*b*), when the wire 60 is moves forward as the tension is released and/or when tension is being applied to the other wire 60. In this way, the sliders 56 do not necessarily have to travel with the drivers 54 when drivers 54 are moving forward (e.g., in direction 61*b*).

FIG. 6A further illustrates that the rotator 50 can have female engagers 52 and that the first and second drivers 54*a*, 54*b* can have male engagers 55. As another example, the male engagers 55 can be on the rotator 50 and the female engagers 52 can be on the first and second drivers 54*a*, 54*b*. The male engagers 55 can be moveable in the female engagers 52 when the rotator 50 is rotated. For example, the male engagers 55 can slide in the female engagers 52 as the rotator 50 is rotated.

The female engagers 52 can be paths on an inner surface of the rotator 50 that the male engagers 55 can move in when the rotator 50 is rotated, including, for example, grooves, channels, female threads, etc. The rotator 50 can have a first female engager 52a and a second female engager 52b. The first and second female engagers 52a, 52b can be helical or non-helical. The first and second female engagers 52a, 52b can cross each other. FIG. 6A illustrates that the female engagers 52 can be female threads. For example, the first female engager 52a can be a first female thread and the second female engager 52b can be a second female thread. The first and second female threads can be opposite directions from each other so that the first and second drivers 54a, 54b can move in opposite directions when the rotator 50 is moved in the first direction 59a and can move in opposite directions when the rotator 50 is moved in the second direction 59b. For example, the first female thread can be clockwise female threads (e.g., right-hand female threads) and the second female thread can be counterclockwise female threads (e.g., left-hand female threads). The female engagers 52 can face inward, for example, toward the lumen center longitudinal axis A1. The opposite directions of the first and second female engagers 52a, 52b can advantageously cause the drivers 54 to move opposite of each other when the rotator 50 is turned. When one driver 54 goes in the first direction 61a, the other driver 54 goes in the second direction 61b.

The male engagers 55 can be protrusions that extend from the first and second drivers 54a, 54b, including, for example, teeth, ridges, male threads, etc. The first and second male engagers 55a, 55b can be helical or non-helical. The first driver 54a can have a first male engager 55a and the second driver 54b can have a second male engager 55b. The first and second drivers 54a, 54b can be attached to the rotator 50 via engagement of the male engagers 55 with the female engagers 52. The first male engager 55a can move in the first female engager 52a when the rotator 50 is rotated and the second male engager 55b can move in the second female engager 52b when the rotator 50 is rotated. FIG. 6A illustrates that the male engagers 55 can be male threads. For example, the first male engager 55a can be a first male thread and the second male engager 55b can be a second male thread. The first and second male threads can be opposite directions from each other so that the first and second drivers 54a, 54b can move in opposite directions when the rotator 50 is moved in the first direction 59a and can move in opposite directions when the rotator 50 is moved in the second direction 59b. For example, the first male thread can be a clockwise male thread (e.g., a right-hand male thread) and the second male thread can be a counterclockwise male thread (e.g., a left-hand male thread). The male engagers 55 can face outward, for example, away from the lumen center longitudinal axis A1.

FIG. 6A further illustrates that the drivers 54 can slide freely on the rods 58 when the rotator 50 is rotated in the first and second directions 59a, 59b. When the rotator 50 is not being rotated, the engagement of the female and male engagers 52, 55 can prevent longitudinal motion of the drivers 54 along the rods 58 in first and second directions 61a, 61b. The steering system 16 can thus remain in any position that the user leaves it in. This can allow the user to release their hand from the steering control 42 without the steering system 16 becoming more or less deflected or returning to the neutral configuration when the user releases their hand.

FIG. 6A further illustrates that the sliders 56 can slide freely on the rods 58 when the rotator 50 is rotated and when the rotator 50 is not being rotated. The sliders 56 can be pushed by drivers 54 in the first direction 61a (e.g., when applying tension to a wire 60) and can be pulled by the wires 60 in the second direction 61b (e.g., after removing tension from the wire 60).

FIG. 6A further illustrates that the drivers 54, the sliders 56, and the rods 58 can be inside the rotator 50.

FIG. 6A further illustrates that the rotator 50 and/or the rods 58 can have a length of a be about 3 inches to about 5 inches, which can provide about 2 inches to 3 inches for the drivers 54 to push the sliders 56. This can allow the tip of the sheath to deflect 180 degrees or more in a first direction (e.g., to the right when the steering control 42 is turned in the first direction 59a) and to deflect 180 degrees or more in a second direction (e.g., to the left when the steering control 42 is turned in the second direction 59b).

FIG. 6A further illustrates that the wires 60 can extend through holes in the drivers and sliders 54, 56, and that the wires 60 can extend to the distal tip via holes in the wall of the sheath 8. As another example, the wires 60 can extend to the distal tip in the lumen 15 or on the outside of the sheath 8.

FIG. 6A further illustrates that the rotator 50 can be kept intact with a heat shrink 62. For example, the rotator 50 can comprise two pieces (e.g., two halves) that can be put together like a clam shell. The rotator 50 can be manufactured (e.g., molded) in two pieces, for example, to add the two different female engagers 52a and 52b on the inside surface. In the process of bringing the two halves together, the rotator 50 can capture the first and second mounts 44, 48. The heat shrink 62 can keep the two halves of thee rotator 50 together so that they do not come in and out of plane. As another example, the two pieces of the rotator 50 can be snapped together with or without also being sealed closed with the heat shrink 62.

FIG. 6B illustrates the drivers and sliders 54, 56 in an exemplary first deflected configuration. The exemplary first deflected configuration is represented by the dashed lines in FIG. 6B and is shown superimposed over the neutral configuration of FIG. 6A to show the relative positions of the drivers and sliders 54, 56 in a first deflected configuration relative to the neutral configuration. As shown in FIG. 6B, when the rotator 50 is rotated in direction 59a, the first and second drivers 54a, 54b can move in directions 61a, and 61b, respectively. FIG. 6B further illustrates that when the rotator 50 is rotated in the direction 59a, the first driver 54a can be moved into and push the first slider 56a in the first direction 61a to apply tension to the first wire 60a.

FIG. 6C illustrates the drivers and sliders 54, 56 in an exemplary second deflected configuration. The exemplary second deflected configuration is represented by the dashed lines in FIG. 6C and is shown superimposed over the neutral configuration of FIG. 6A to show the relative positions of the drivers and sliders 54, 56 in a second deflected configuration relative to the neutral configuration. As shown in FIG. 6C, when the rotator 50 is rotated in direction 59b, the first and second drivers 54a, 54b can move in directions 61b, and 61a, respectively. FIG. 6B further illustrates that when the rotator 50 is rotated in the direction 59b, the second driver 54b can be moved into and push the second slider 56b in the first direction 61a to apply tension to the second wire 60b.

FIG. 6D illustrates that the rotator 50 can have a rotator first half 50a and a rotator second half 50b, and that the rotator first and second halves 50a, 50b can be attached (e.g., snapped together). The housing 12 is shown transparent in FIG. 6D for illustrative purposes only.

FIG. 6E illustrates that the rods 58 can be parallel to each other. Figure further illustrates that the first and second female engagers 52a, 52b can cross each other, crisscrossing down the length of the of the rotator 50. As shown in FIG. 6E, the first and second female engagers 52a, 52b can form "X's" on the inner surface of the rotator 50 where they cross each other. The male engagers 55 (e.g., the first and second male engagers 55a, 55b) can be sized so that they can cross over the intersections where the first and second female engagers 52a, 52b intersect with each other without getting caught up or hung up at the intersection. As another example, where the rotator 50 comprises two halves attached together, there can be a seam (e.g., a little gap) where the two halves come together. The male engagers 55 (e.g., the first and second male engagers 55a, 55b) can be sized so that they can cross over the seam without getting caught up or hung up at the seam.

FIG. 6E further illustrates that the drivers and sliders 54, 56 can have holes 64 for the wires 60. In FIG. 6E, the rotator 50 is shown partially transparent for illustrative purposes only, and the wires 60, the steering control 42, and the housing 12 are shown fully transparent for illustrative purposes only.

FIG. 6F illustrates that the proximal side of the hole 64 in the sliders 56 can be larger, for example, so that the crimp 61 in the wires 60 can fit in the hole 64. A number of features from the steering system 16 in FIG. 6F are shown transparent for illustrative purposes only.

The system 6 can have any combination of the features described and/or illustrated herein. For example, the system 6 can have the valve system 10, the steering system 16, or both the valve and steering systems 10, 16.

Many modifications will be apparent to those skilled in the art without departing from the scope of the present disclosure.

Like reference numerals in the drawings indicate identical or functionally similar features/elements.

All dimensions disclosed herein are exemplary. The dimensions disclosed herein can at least be expanded to ranges from about 50% to about 150% of the exemplary dimension shown herein, more narrowly from about 75% to about 125% of the exemplary dimension shown herein. Language such as "at least," "greater than," "less than," "between," and the like includes the number recited.

Any range disclosed can include any subrange of the range disclosed, for example, a range of 1-10 units can include 2-10 units, 8-10 units, or any other subrange.

The words "may" and "can" are interchangeable (e.g., "may" can be replaced with "can" and "can" can be replaced with "may").

Any elements described herein as singular can be pluralized (e.g., anything described as "one" can be more than one, anything referred to with an indefinite article, e.g., "a" or "an," can be more than one, anything referred to with the definite article "the" can be more than one, etc.).

Any species element of a genus element can have the characteristics or elements of any other species element of that genus.

The above-described and illustrated features, elements, configurations, assemblies, sub-assemblies, complete assemblies, and/or methods and their elements for carrying out the disclosure can be combined and/or modified with each other in any combination.

Any of the below claims and/or variations can be combined and/or modified with each other in any combination, as well as combined and/or modified with any other portion of the disclosure in any combination. The below claims are exemplary and not limiting.

Some elements may be absent from individual figures for reasons of illustrative clarity.

Any phrase involving an "A and/or B" construction can mean (1) A alone, (2) B alone, (3) A and B together.

The claims are not limited to the exemplary variations shown in the drawings, but instead may claim any feature disclosed or contemplated in the disclosure as a whole. Any elements described herein as singular can be pluralized (i.e., anything described as "one" can be more than one).

We claim:

1. A catheter comprising a valve system, the valve system comprising:
   a first valve comprising a first control, a first control lock, and a first compressor within and engaged with the first control lock, and
   a second valve comprising a second control,
   where the first valve is openable and closeable with the first control, and
   where the second valve is openable and closeable with the second control; and
   where the first control lock engages with the first control to lock the first valve.

2. The catheter of claim 1, the first valve comprises a variable on and off valve, and where the second valve comprises a variably closable normally open momentary valve.

3. The catheter of claim 2, where the first valve comprises a quick turn lock valve, and where the second valve is biased to passively re-open from a closed position.

4. The catheter of claim 1, where the second valve comprises a second compressor and a spring, where the second compressor is deformable by the second control, and where the second control is movable from a second control closed position to a second control open position via the spring.

5. The catheter of claim 1, where the first valve and the second valve are closable against a device in a lumen of the catheter.

6. The catheter of claim 5, where a handle of the catheter comprises the lumen.

7. The catheter of claim 5, where when the first valve and the second valve are in a fully closed configuration without the device in the lumen, the first valve and the second valve each form a fluid tight seal.

8. The catheter of claim 5, where when the first valve and the second valve are in a partially closed configuration against the device in the lumen, the first valve and the second valve each form a fluid tight seal against the device.

9. The catheter of claim 8, where when the first valve and the second valve are in the partially closed configuration against the device in the lumen, the device is longitudinally movable in the lumen.

10. The catheter of claim 1, further comprising a steering system comprising a rotator, a driver, and a slider, where the driver and the slider are closer to a longitudinal axis of the steering system than the rotator.

11. The catheter of claim 10, where the valve system is removably attachable to the steering system.

12. A catheter comprising a steering system, the steering system comprising:
   a rotator;
   a first driver and a first slider, wherein the first driver is configured to push the first slider axially, wherein the first driver is releasably engageable with the first slider;

a second driver and a second slider, wherein the second driver is configured to push the second slider axially, wherein the second driver is releasably engageable with the second slider;

where the first driver, the first slider, the second driver, and the second slider are closer to a longitudinal axis of the steering system than the rotator, wherein the rotator is configured to rotate with respect to the longitudinal axis to move the first driver, the first slider, the second driver, and the second slider axially.

13. The catheter of claim 12, where the rotator has a first female engager and second female engager, where the first driver has a first male engager slidable in the first female engager, and where the second driver has a second male engager slidable in the second female engager.

* * * * *